United States Patent
Williams et al.

(10) Patent No.: US 10,458,582 B2
(45) Date of Patent: Oct. 29, 2019

(54) SINGLE ACTION PUSH TO CONNECT CONDUIT FITTING WITH COLLETING

(71) Applicant: Swagelok Company, Solon, OH (US)

(72) Inventors: Peter C. Williams, Cleveland Heights, OH (US); Cal R. Brown, Lyndhurst, OH (US); James E. Gotch, Kirtland, OH (US); Connor M. Dorony, Lakewood, OH (US); Stephen J. Zaborszki, Northfield Center, OH (US); Douglas J. McClure, Mentor, OH (US); Douglas S. Welch, Chesterland, OH (US); Gregory S. Kalata, Avon, OH (US); Ronald P. Campbell, Shaker Heights, OH (US)

(73) Assignee: SWAGELOK COMPANY, Solon, OH (US)

( * ) Notice: Subject to any disclaimer, the term of this patent is extended or adjusted under 35 U.S.C. 154(b) by 442 days.

(21) Appl. No.: 15/135,645

(22) Filed: Apr. 22, 2016

(65) Prior Publication Data
US 2016/0312932 A1    Oct. 27, 2016

Related U.S. Application Data

(60) Provisional application No. 62/151,465, filed on Apr. 23, 2015.

(51) Int. Cl.
*F16L 37/092* (2006.01)

(52) U.S. Cl.
CPC .................. *F16L 37/092* (2013.01)

(58) Field of Classification Search
CPC ....... F16L 37/092; F16L 37/08; F16L 37/084; F16L 37/085; F16L 37/123; F16L 37/22; F16L 37/23

(Continued)

(56) References Cited

U.S. PATENT DOCUMENTS

| 1,337,288 A | 4/1920 | Stichler |
| 2,429,202 A | 10/1947 | Estill et al. |

(Continued)

FOREIGN PATENT DOCUMENTS

| AT | 228575 | 7/1963 |
| CN | 101162068 | 4/2008 |

(Continued)

OTHER PUBLICATIONS

Search Report from European Application No. 18185089.2 dated Nov. 27, 2018.

(Continued)

*Primary Examiner* — Aaron M Dunwoody
(74) *Attorney, Agent, or Firm* — Calfee, Halter & Griswold LLP

(57) ABSTRACT

A push to connect fitting assembly includes first and second fitting components joined to define an interior cavity, a seal device, and a retainer. The seal device is disposed in the interior cavity, and seals one of the first and second fitting components with an outer surface of a conduit end when the conduit end is inserted into the outboard end of the first fitting component. The retainer is assembled with at least one of the first and second fitting components, and includes a gripping portion that engages the inserted conduit over a first surface contact area to grip the conduit end, and a colleting portion outboard of the gripping portion. The colleting portion engages the inserted conduit end over a second surface contact area greater than the first surface contact area to collet the inserted conduit end.

20 Claims, 26 Drawing Sheets

(58) Field of Classification Search
USPC .................................. 285/307, 317, 322
See application file for complete search history.

(56) References Cited

U.S. PATENT DOCUMENTS

| | | | |
|---|---|---|---|
| 2,561,887 A | | 7/1951 | Risley |
| 2,702,202 A | * | 2/1955 | Kaiser .................. F16L 37/092 |
| | | | 285/108 |
| 2,848,135 A | | 8/1958 | Rickard et al. |
| 2,848,256 A | * | 8/1958 | Tyler ...................... F16L 37/05 |
| | | | 285/317 |
| 2,914,344 A | | 11/1959 | Anthes |
| 3,398,977 A | | 8/1968 | Yoneda |
| 3,453,005 A | | 7/1969 | Foults |
| 3,773,360 A | | 11/1973 | Timbers |
| 3,887,222 A | | 6/1975 | Hammond |
| 4,055,359 A | | 10/1977 | McWethy |
| 4,105,226 A | | 8/1978 | Frey |
| 4,111,464 A | | 9/1978 | Asano et al. |
| 4,135,745 A | | 1/1979 | Dehar |
| 4,163,573 A | * | 8/1979 | Yano ...................... F16L 37/088 |
| | | | 285/148.13 |
| 4,191,408 A | | 3/1980 | Acker |
| 4,193,616 A | | 3/1980 | Sarson et al. |
| 4,240,654 A | | 12/1980 | Gladieux |
| 4,298,220 A | | 11/1981 | Kukuminato |
| 4,304,422 A | | 12/1981 | Schwarz |
| 4,311,328 A | | 1/1982 | Truchet |
| 4,401,326 A | | 8/1983 | Blair |
| 4,455,177 A | | 6/1984 | Filippov et al. |
| 4,540,201 A | * | 9/1985 | Richardson ......... F16L 37/1215 |
| | | | 285/101 |
| 4,645,245 A | | 2/1987 | Cunningham |
| 4,685,706 A | | 8/1987 | Kowal et al. |
| 4,703,958 A | | 11/1987 | Fremy |
| 4,719,971 A | * | 1/1988 | Owens .................. E21B 33/043 |
| | | | 166/191 |
| 4,750,765 A | | 6/1988 | Cassidy et al. |
| 4,752,088 A | | 6/1988 | Stahl et al. |
| 4,793,637 A | | 12/1988 | Laipply et al. |
| 4,813,716 A | | 3/1989 | Lalikos et al. |
| 4,834,423 A | | 5/1989 | DeLand |
| 4,872,710 A | | 10/1989 | Konecny et al. |
| 4,893,810 A | | 1/1990 | Lee |
| 4,906,031 A | | 3/1990 | Vyse |
| 4,923,228 A | | 5/1990 | Laipply |
| 5,005,877 A | | 4/1991 | Hayman |
| 5,022,687 A | | 6/1991 | Ariga |
| 5,024,468 A | | 6/1991 | Burge |
| 5,042,848 A | | 8/1991 | Shiozaki |
| 5,044,401 A | | 9/1991 | Giesler et al. |
| 5,044,672 A | * | 9/1991 | Skeels .................. E21B 43/013 |
| | | | 166/344 |
| 5,076,541 A | | 12/1991 | Daghe et al. |
| 5,118,140 A | * | 6/1992 | Racine .................. F16L 37/092 |
| | | | 285/102 |
| 5,176,409 A | * | 1/1993 | Brooks .................. F16L 17/08 |
| | | | 285/334.4 |
| 5,181,751 A | | 1/1993 | Kitamura |
| 5,226,682 A | | 7/1993 | Marrison et al. |
| 5,246,236 A | * | 9/1993 | Szarka .................. E21B 34/06 |
| | | | 277/337 |
| 5,284,369 A | | 2/1994 | Kitamura |
| 5,301,408 A | | 4/1994 | Berman et al. |
| 5,401,065 A | | 3/1995 | Okumura et al. |
| 5,474,336 A | | 12/1995 | Hoff et al. |
| 5,553,895 A | | 9/1996 | Karl et al. |
| 5,562,371 A | | 10/1996 | Reed |
| 5,566,987 A | | 10/1996 | Mazhar |
| 5,570,910 A | | 11/1996 | Highlen |
| 5,632,651 A | | 5/1997 | Szegda |
| 5,653,480 A | | 8/1997 | Mine |
| 5,662,359 A | * | 9/1997 | Kargula ............... F16L 37/0987 |
| | | | 285/307 |
| 5,681,061 A | | 10/1997 | Olson |
| 5,683,120 A | | 11/1997 | Brock |
| 5,685,575 A | | 11/1997 | Allread et al. |
| 5,967,477 A | | 10/1999 | Walmsley |
| 6,056,327 A | * | 5/2000 | Bouldin .................. E21B 17/02 |
| | | | 285/342 |
| 6,073,976 A | | 6/2000 | Schmidt et al. |
| 6,152,496 A | | 11/2000 | Kouda |
| 6,186,557 B1 | | 2/2001 | Funk |
| 6,334,634 B1 | | 1/2002 | Osterkil |
| 6,349,978 B1 | | 2/2002 | McFarland |
| 6,390,511 B1 | | 5/2002 | Kargula |
| 6,447,017 B1 | | 9/2002 | Gilbreath et al. |
| 6,464,266 B1 | | 10/2002 | O'Neill et al. |
| 6,510,895 B1 | * | 1/2003 | Koleilat .................. E21B 33/043 |
| | | | 166/208 |
| 6,517,126 B1 | | 2/2003 | Peterson |
| 6,561,551 B2 | | 5/2003 | Kawakami et al. |
| 6,604,760 B2 | | 8/2003 | Cresswell et al. |
| 6,629,708 B2 | | 10/2003 | Williams et al. |
| 6,769,720 B2 | | 8/2004 | Dahms et al. |
| 6,893,051 B1 | * | 5/2005 | Park .................... F16L 37/0925 |
| | | | 285/104 |
| 6,964,435 B2 | | 11/2005 | Wolf et al. |
| 6,983,959 B2 | | 1/2006 | Wolf et al. |
| 6,986,533 B2 | * | 1/2006 | Ko ...................... F16L 37/0925 |
| | | | 285/313 |
| 6,991,265 B2 | * | 1/2006 | Walmsley ............ F16L 37/092 |
| | | | 285/307 |
| 7,029,035 B2 | | 4/2006 | Seymour, II et al. |
| 7,100,949 B2 | | 9/2006 | Williams et al. |
| 7,140,645 B2 | | 11/2006 | Cronley |
| 7,195,286 B2 | | 3/2007 | Hama |
| 7,208,052 B2 | | 4/2007 | Hammond et al. |
| 7,240,929 B2 | | 7/2007 | Williams et al. |
| 7,264,281 B2 | | 9/2007 | LeQuere |
| 7,273,236 B2 | | 9/2007 | LeQuere |
| 7,369,595 B2 | | 5/2008 | Williams et al. |
| 7,387,318 B2 | | 6/2008 | Yoshida |
| 7,419,012 B2 | | 9/2008 | Lynch |
| 7,488,006 B2 | | 2/2009 | Dahms et al. |
| 7,506,899 B2 | | 3/2009 | Feith |
| 7,516,989 B2 | | 4/2009 | Yoshida |
| 7,533,908 B2 | | 5/2009 | Vogel |
| 7,543,854 B2 | | 6/2009 | Dahms |
| 7,614,668 B1 | | 11/2009 | Williams et al. |
| 7,699,358 B2 | | 4/2010 | Williams et al. |
| 7,762,595 B2 | | 7/2010 | Enderich et al. |
| 7,806,443 B1 | | 10/2010 | Plattner |
| 7,850,208 B2 | | 12/2010 | Greenberger |
| 7,914,050 B2 | | 3/2011 | Udhofer |
| 7,922,214 B2 | | 4/2011 | Nakamura et al. |
| 8,033,524 B2 | * | 10/2011 | Tiberghien .......... F16L 37/0841 |
| | | | 251/149.6 |
| 8,240,719 B2 | | 8/2012 | Udhofer |
| 8,555,624 B2 | | 10/2013 | Lechner |
| 8,757,670 B2 | * | 6/2014 | Kim ...................... F16L 37/0925 |
| | | | 285/317 |
| 9,447,906 B2 | | 9/2016 | Bobo |
| 9,541,228 B2 | | 1/2017 | Bobo |
| 9,611,965 B2 | | 4/2017 | Cheon |
| 9,746,114 B2 | | 8/2017 | LeQuere |
| 2002/0140227 A1 | | 10/2002 | Kawakami et al. |
| 2004/0094957 A1 | | 5/2004 | Walmsley et al. |
| 2005/0023832 A1 | * | 2/2005 | Edler ...................... F16L 25/0036 |
| | | | 285/354 |
| 2006/0220380 A1 | | 10/2006 | Yoshino |
| 2007/0013188 A1 | * | 1/2007 | Dallas ...................... F16L 17/08 |
| | | | 285/354 |
| 2007/0164563 A1 | | 7/2007 | Arstein et al. |
| 2008/0088127 A1 | | 4/2008 | Tiberghien |
| 2008/0136178 A1 | | 6/2008 | Udhofer et al. |
| 2008/0220380 A1 | | 9/2008 | Bristol et al. |
| 2009/0121478 A1 | | 5/2009 | Tsujita |
| 2009/0178733 A1 | | 7/2009 | Somers et al. |
| 2009/0214287 A1 | | 8/2009 | Usui et al. |
| 2010/0171302 A1 | | 7/2010 | Yoder |

(56) References Cited

U.S. PATENT DOCUMENTS

| | | | | |
|---|---|---|---|---|
| 2010/0300705 | A1* | 12/2010 | Nelson | E21B 33/04 166/387 |
| 2011/0227337 | A1 | 9/2011 | Kattler | |
| 2013/0020799 | A1* | 1/2013 | Silveira | F16L 19/08 285/351 |
| 2013/0119659 | A1 | 5/2013 | Williams et al. | |
| 2013/0207385 | A1 | 8/2013 | Williams et al. | |
| 2015/0115602 | A1 | 4/2015 | Clason et al. | |
| 2015/0240980 | A1 | 8/2015 | Bobo et al. | |
| 2015/0263498 | A1 | 9/2015 | Thomas | |
| 2015/0345683 | A1 | 12/2015 | Crompton | |
| 2016/0126716 | A1 | 5/2016 | Crompton | |
| 2016/0161038 | A1 | 6/2016 | Crompton | |
| 2016/0273695 | A1 | 9/2016 | Bobo | |
| 2016/0327196 | A1 | 11/2016 | Gledhill | |
| 2017/0082231 | A1 | 3/2017 | Crompton | |

FOREIGN PATENT DOCUMENTS

| | | |
|---|---|---|
| CN | 102203491 | 9/2011 |
| DE | 2741512 | 4/1979 |
| DE | 7914106 | 8/1979 |
| DE | 2824943 | 12/1979 |
| DE | 2856069 | 7/1980 |
| DE | 2912160 | 10/1980 |
| DE | 2922869 | 12/1980 |
| DE | 4243844 | 6/1994 |
| DE | 19517269 | 11/1996 |
| DE | 1987355 | 2/2000 |
| DE | 10125499 | 8/2002 |
| DE | 102006015555 | 1/2007 |
| DE | 202006018794 | 4/2008 |
| DE | 19932307 | 1/2011 |
| EP | 156575 | 10/1985 |
| EP | 368795 | 5/1990 |
| EP | 373920 | 6/1990 |
| EP | 511436 | 11/1992 |
| EP | 615089 | 9/1994 |
| EP | 676019 | 10/1995 |
| EP | 715111 | 6/1996 |
| EP | 718538 | 6/1996 |
| EP | 735306 | 10/1996 |
| EP | 762036 | 3/1997 |
| EP | 898109 | 2/2000 |
| EP | 1235023 | 8/2002 |
| EP | 2163802 | 3/2010 |
| EP | 2589848 | 5/2013 |
| EP | 2558763 | 3/2016 |
| EP | 2817548 | 3/2016 |
| FR | 2545908 | 11/1984 |
| GB | 2104607 | 3/1983 |
| GB | 2325718 | 12/1998 |
| GB | 2398612 | 8/2004 |
| GB | 2445701 | 7/2008 |
| GB | 2480880 | 12/2011 |
| JP | H022035 | 1/1990 |
| JP | H0320637 | 3/1991 |
| JP | H05312283 | 11/1993 |
| JP | H06272795 | 9/1994 |
| JP | H07190272 | 7/1995 |
| JP | H0510038 | 9/1998 |
| JP | 2001182883 | 7/2001 |
| JP | 2003014169 | 1/2003 |
| JP | 2009523967 | 6/2009 |
| JP | 2013542378 | 11/2013 |
| WO | 97/13394 | 4/1997 |
| WO | 02/29300 | 4/2002 |
| WO | 02/29301 | 4/2002 |
| WO | 07/084183 | 7/2007 |
| WO | 07/117688 | 10/2007 |
| WO | 2008/051500 | 5/2008 |
| WO | 2011/102637 | 8/2011 |
| WO | 12/018576 | 2/2012 |
| WO | 12/051481 | 4/2012 |
| WO | 13/056273 | 4/2013 |

OTHER PUBLICATIONS

Office action from European Application No. 16719710.2 dated Nov. 16, 2018.
International Search Report and Written Opinion from PCT/US11/45145 dated Dec. 23, 2011.
International Search Report and Written Opinion from PCT/US11/056259 dated Feb. 29, 2012.
International Search Report and Written Opinion from PCT/US14/61704 dated Jan. 14, 2015.
Notice of Allowance from U.S. Appl. No. 13/878,828 dated Aug. 11, 2017.
Advisory Action from U.S. Appl. No. 13/878,828 dated Jul. 19, 2017.
Advisory Action from U.S. Appl. No. 13/878,828 dated Jun. 19, 2017.
Office action from U.S. Appl. No. 13/878,828 dated Mar. 31, 2017.
Interview Summary from U.S. Appl. No. 13/878,828 dated Dec. 2, 2016.
Office action from U.S. Appl. No. 13/878,828 dated Sep. 8, 2016.
Office actdion from U.S. Appl. No. 13/878,828 dated May 18, 2015.
Notice of Allowance from U.S. Appl. No. 14/520,616 dated Jun. 5, 2017.
Notice of Allowance from U.S. Appl. No. 14/520,616 dated Feb. 16, 2017.
Office action from U.S. Appl. No. 14/520,616 dated Sep. 28, 2016.
Office action from Chinese Application No. 201180036507.7 dated Jun. 27, 2014.
Office action from Chinese Application No. 201180036507.7 dated Apr. 28, 2015.
Office action from Chinese Application No. 201180049676.4 dated Jul. 28, 2014.
Office action from Chinese Application No. 201180049676.4 dated May 26, 2015.
Office action from Chinese Application No. 201480070848.X dated May 17, 2017.
Search Report from European Patent Application No. 11815036.6 dated May 27, 2014.
Search Report from European Application No. 14856769.6 dated May 2, 2017.
Office action from Japanese Application No. 2013-534019 dated Aug. 11, 2015.
Quick connect Plumbing Solutions Video web pages, Watts.com, 2 pgs., copyright 2017.
Plumbing Supply.Com, Speedfit Quick Connect Fittings by John Guest, 40 pgs., accessed on Apr. 27, 2017.
Speedfit Plastic push-in fittings stop valve, 1 pg., issued Jul. 1997, RS Components.
International Search Report and Written Opinion from PCT/US2016/028741 dated Aug. 30, 2016.
Office action from U.S. Appl. No. 15/922,125 dated Feb. 21, 2019.

* cited by examiner

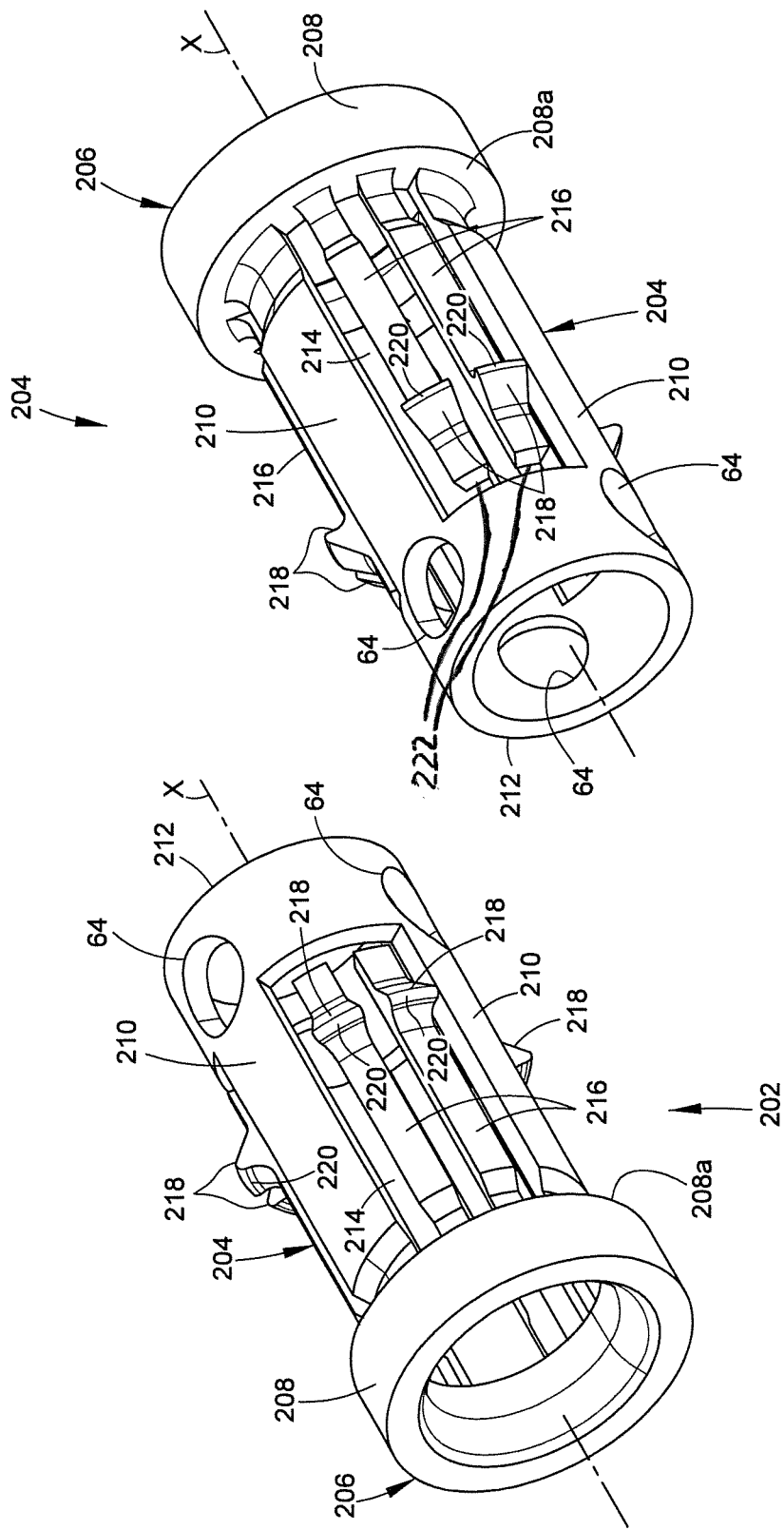

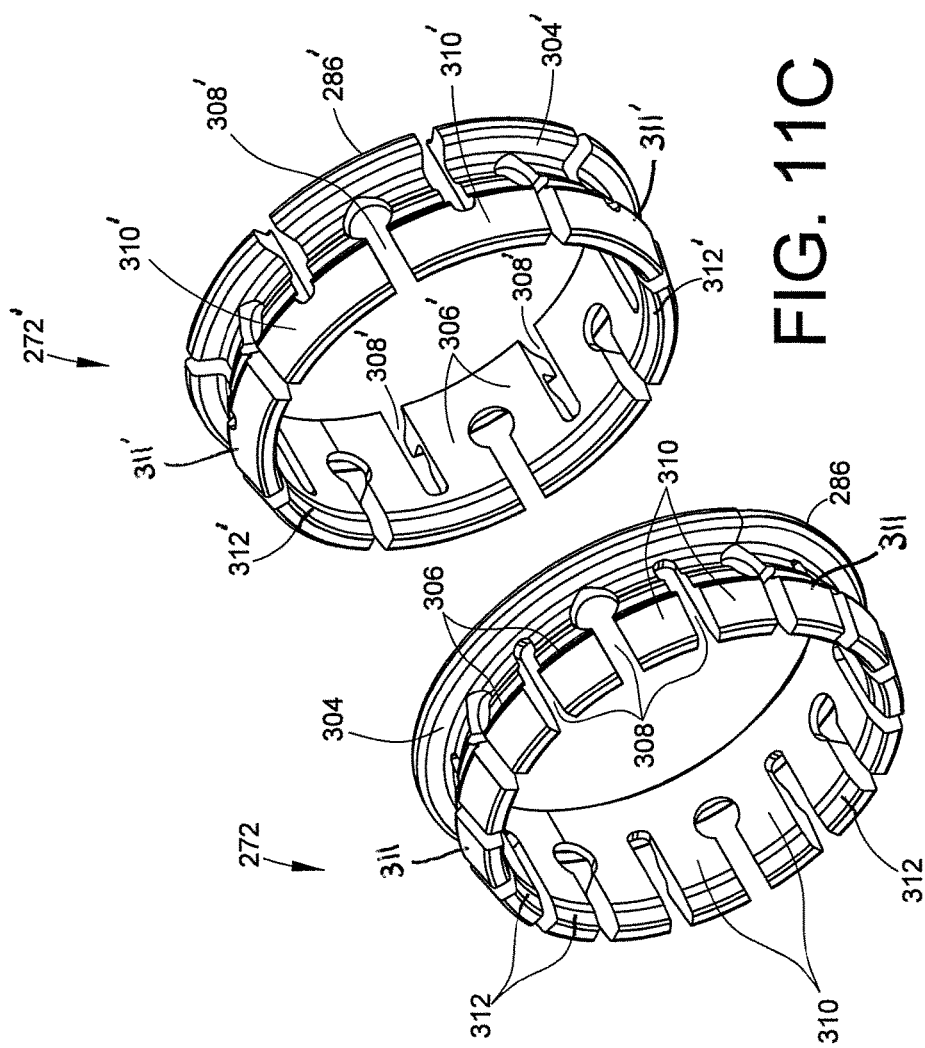

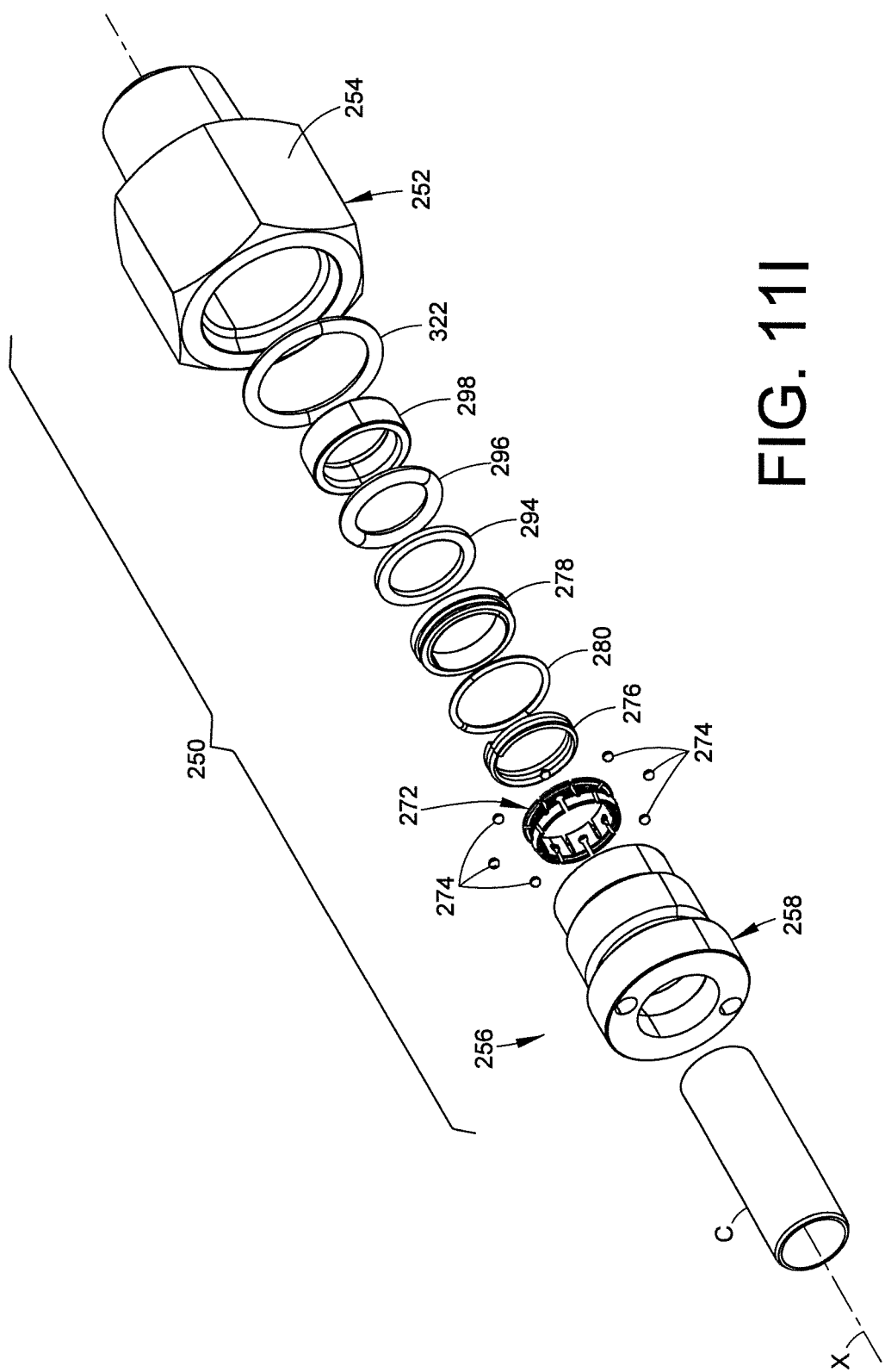

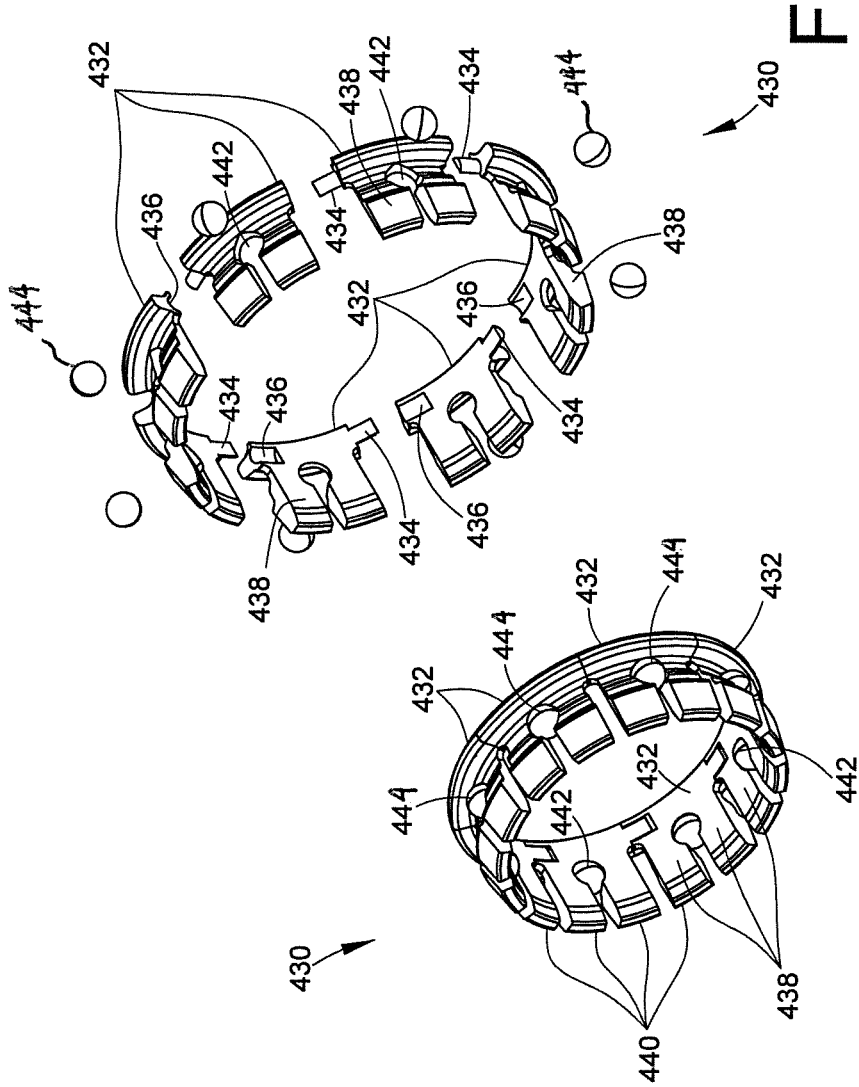

SINGLE ACTION PUSH TO CONNECT CONDUIT FITTING WITH COLLETING

CROSS-REFERENCE TO RELATED APPLICATION

This application claims priority to and all benefit of U.S. Provisional Patent Application Ser. No. 62/252,465, filed on Apr. 23, 2016, for SINGLE ACTION PUSH TO CONNECT CONDUIT FITTING WITH COLLETING, the entire disclosure of which is fully incorporated herein by reference.

TECHNICAL FIELD OF THE DISCLOSURE

The inventions relate generally to fittings for conduits such as tube and pipe. More particularly, the inventions relate to fittings that provide single action push to connect operation.

SUMMARY OF THE EXEMPLARY EMBODIMENTS

A first inventive concept described herein is a fitting assembly for a conduit, for example tube or pipe, in which a single action on the conduit can be used to achieve a fluid tight seal and retention of the conduit without need for subsequent action or motion. In an exemplary embodiment, a conduit can optionally be hand held or otherwise inserted into a first end of the fitting assembly so as to engage a seal device and a conduit gripping member with a single action on the conduit to achieve a fluid tight seal and retention of the conduit by the conduit gripping member. No subsequent action is needed such as rotation, tightening or clamping of the fitting components. This embodiment may also be referred to herein as a single action push to connect fitting. Additional embodiments are described herein.

According to an exemplary aspect of the present application, a fitting assembly is disclosed for conduit such as tube or pipe in which a single action on the conduit can be used to achieve a fluid tight seal and retention of the conduit without need for subsequent action or motion. The fitting assembly includes a retainer that grips the conduit, and further the retainer includes a colleting feature that reduces or minimizes conduit vibration and rotary flex that may otherwise adversely affect performance of the fitting assembly. Additional embodiments are described herein.

In an exemplary embodiment, a push to connect fitting assembly includes first and second fitting components, a seal device, and a retainer. The first fitting component has an outboard end that is adapted to receive a conduit end. The second fitting component is joined to the first fitting component to define an interior cavity. The seal device is disposed in the interior cavity, and seals one of the first and second fitting components with an outer surface of a conduit end when the conduit end is inserted into the outboard end of the first fitting component. The retainer is assembled with at least one of the first and second fitting components, and includes a gripping portion that engages the inserted conduit end over a first surface contact area to grip the conduit end, and a colleting portion outboard of the gripping portion. The colleting portion engages the inserted conduit over a second surface contact area greater than the first surface contact area to collet the inserted conduit end.

In another exemplary embodiment, a push to connect fitting assembly includes first and second fitting components, a seal device, and a retainer. The first fitting component has an outboard end that is adapted to receive a conduit end. The second fitting component is joined to the first fitting component to define an interior cavity. The seal device is disposed in the interior cavity, and seals one of the first and second fitting components with an outer surface of a conduit end when the conduit end is inserted into the outboard end of the first fitting component. The retainer is assembled with at least one of the first and second fitting components, and includes a gripping portion comprising a plurality of circumferentially spaced bearing members that grip the inserted conduit end, and a colleting portion outboard of the gripping portion, wherein the colleting portion collets the inserted conduit end.

In another exemplary embodiment, a push to connect fitting assembly includes first and second fitting components, a seal device, and a retainer. The first fitting component has an outboard end that is adapted to receive a conduit end. The second fitting component is joined to the first fitting component to define an interior cavity. The seal device is disposed in the interior cavity, and seals one of the first and second fitting components with an outer surface of a conduit end when the conduit end is inserted into the outboard end of the first fitting component. The retainer is assembled with the second fitting component, and includes a gripping portion and a colleting portion outboard of the gripping portion. The gripping portion is spring biased radially inward toward gripping engagement with the inserted conduit end, and the colleting portion is spring biased radially inward toward colleting engagement with the inserted conduit end.

In another exemplary embodiment, a push to connect fitting assembly includes first and second fitting components, a seal device, and a retainer. The first fitting component has an outboard end that is adapted to receive a conduit end. The second fitting component is joined to the first fitting component to define an interior cavity. The seal device is disposed in the interior cavity, and seals one of the first and second fitting components with an outer surface of a conduit end when the conduit end is inserted into the outboard end of the first fitting component. The retainer is assembled with the second fitting component, and includes a gripping portion and a colleting portion outboard of the gripping portion. The gripping portion is biased against a first portion of a continuously tapered interior surface of the fitting assembly to grip the inserted conduit end, and the colleting portion is biased against a second portion of the continuously tapered interior surface of the fitting assembly to collet the inserted conduit end.

In another exemplary embodiment, a push to connect fitting assembly includes first and second fitting components, a seal device, and a retainer. The first fitting component has an outboard end that is adapted to receive a conduit end. The second fitting component is joined to the first fitting component to define an interior cavity. The seal device is disposed in the interior cavity, and seals one of the first and second fitting components with an outer surface of a conduit end when the conduit end is inserted into the outboard end of the first fitting component. The retainer is assembled with the second fitting component, and includes a gripping portion and a colleting portion outboard of the gripping portion. When the conduit end is inserted into the outboard end of the first fitting component and a fluid pressure is applied to the fitting assembly, the seal device is pressurized to apply a biasing force to the gripping portion to bias the gripping portion toward gripping engagement with the inserted conduit end and to the colleting portion to bias the colleting portion toward colleting engagement with the inserted conduit end.

In another exemplary embodiment, a push to connect fitting assembly includes first and second fitting components, a seal device, and a retainer. The first fitting component has an outboard end that is adapted to receive a conduit end. The second fitting component is joined to the first fitting component to define an interior cavity. The seal device is disposed in the interior cavity, and seals one of the first and second fitting components with an outer surface of a conduit end when the conduit end is inserted into the outboard end of the first fitting component. The retainer is assembled with at least one of the first and second fitting components, the retainer including a gripping portion that grips the inserted conduit end, and a colleting portion outboard of the gripping portion, the colleting portion including at least one axially extending, radially flexible member having an end portion adapted to be flexed into engagement with the outer surface of the inserted conduit end to collet the inserted conduit end.

In another exemplary embodiment, a push to connect fitting assembly is provided in combination with a conduit having a longitudinal axis. The fitting assembly includes first and second fitting components, a seal device, and a retainer. The first fitting component has an outboard end that is adapted to receive an end portion of the conduit. The second fitting component is joined to the first fitting component to define an interior cavity. The seal device is disposed in the interior cavity, and seals one of the first and second fitting components with a first outer surface of the conduit end portion when the conduit end portion is inserted into the outboard end of the first fitting component. The retainer is assembled with at least one of the first and second fitting components, and includes a gripping portion comprising a plurality of circumferentially spaced bearing members that grip a second outer surface of the inserted conduit end portion, and a colleting portion outboard of the gripping portion, wherein the colleting portion collets a third outer surface of the inserted conduit end portion.

According to another aspect of the present application, a fitting assembly is disclosed for conduit such as tube or pipe in which a single action on the conduit can be used to achieve a fluid tight seal and retention of the conduit without need for subsequent action or motion is disclosed. The fitting assembly includes a seal device that forms a non-polymeric seal between one of the first and second fitting components and an outer surface of a conduit when the conduit is inserted into the outboard end of the first fitting component. Additional embodiments are described herein.

In another exemplary embodiment, a push to connect fitting assembly includes first and second fitting components, a seal device, and a retainer. The first fitting component has an outboard end that is adapted to receive a conduit end. The second fitting component is joined to the first fitting component to define an interior cavity. The seal device is disposed in the interior cavity, and forms a non-polymeric seal between one of the first and second fitting components and an outer surface of a conduit end when the conduit end is inserted into the outboard end of the first fitting component. The retainer is assembled with at least one of the first and second fitting components, the retainer including a gripping portion that grips the conduit end when the conduit end is inserted into the outboard end of the first fitting component.

These and additional aspects and embodiments of the inventions will be understood by those skilled in the art from the following detailed description of the exemplary embodiments in view of the accompanying drawings.

BRIEF DESCRIPTION OF THE DRAWINGS

FIGS. 10A-10F illustrate other exemplary embodiments of a single action push to connect fitting assembly including a colleting feature, FIGS. 11A-11I illustrate other exemplary embodiments of a single action push to connect fitting assembly including a colleting feature, FIGS. 14A and 14B illustrate an exemplary alternative structure for a ball carrier.

DETAILED DESCRIPTION OF EXEMPLARY EMBODIMENTS

Herein, the terms fitting and fitting assembly are used interchangeably. In various exemplary embodiments, a fitting assembly structure as taught herein is separately claimed as an invention without requiring the conduit to be part of the fitting assembly, and further without requiring that the various parts be in a fully assembled condition (such as may be the case, for example, of the assembly parts being shipped from a manufacturer or distributor.) In at least one embodiment, a fitting assembly includes a first fitting component or subassembly having a seal device and a second fitting component or subassembly having a retainer. In any of the embodiments described herein, the conduit does not require treatment or modification from stock condition, although optionally such may be done if needed in particular applications. For example, it is common for the conduit end to be cut substantially perpendicular to the conduit longitudinal axis and deburred as needed, but even these common steps are optional and not required to achieve conduit grip and fluid tight seal. By stock condition is meant that the conduit may be a conventional hollow right cylinder having a cylindrical inner surface that may be exposed to fluid (for example, liquid, gas or other flowable material) contained by the conduit, and a cylindrical outer surface, with a wall thickness defined as the difference between the inner diameter and the outer diameter of the conduit. The conduit may be made of any material, is preferably metal, and more preferably is a stainless steel alloy, but the inventions are not limited to these exemplary materials and other alternative materials may be used as needed for particular applications. Although traditional hollow cylindrical conduits are preferred, other conduit shapes and geometry may alternatively be used for either the outer wall or inner wall or both walls of the conduit. The word conduit herein refers to traditional tube and pipe but also includes other hollow fluid carrying structures that might be referred to by another word other than tube or pipe.

We also use the terms inboard and outboard for reference purposes only. By inboard we mean towards the center or closed end of the fitting assembly or fitting component along the reference axis, and by outboard we mean away from the center or towards the open end of the fitting assembly or fitting component along the reference axis.

Figure 1:
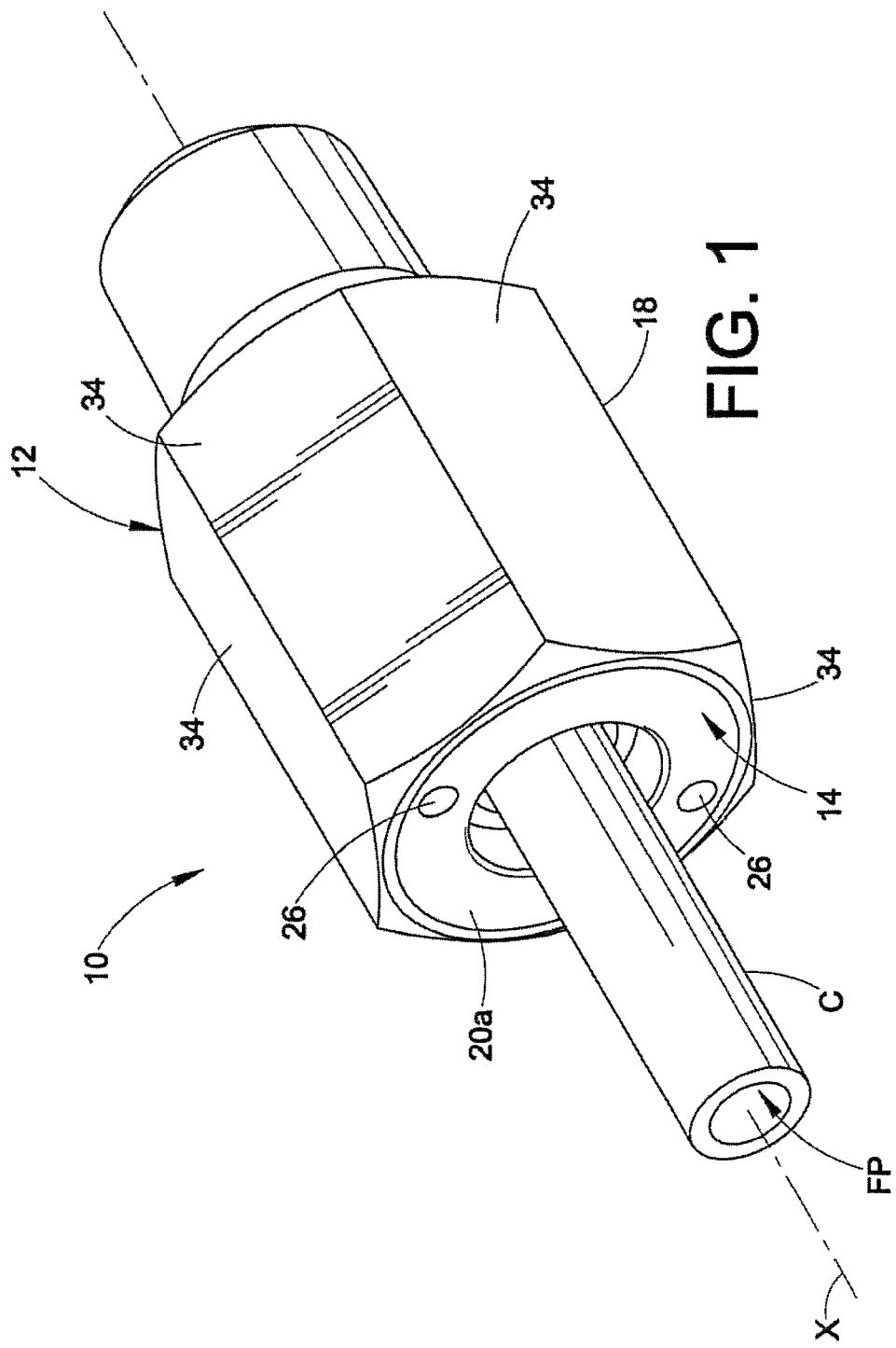
FIG. 1 is an isometric end view of an exemplary embodiment of a fitting assembly with a conduit fully inserted.
Figure 2:
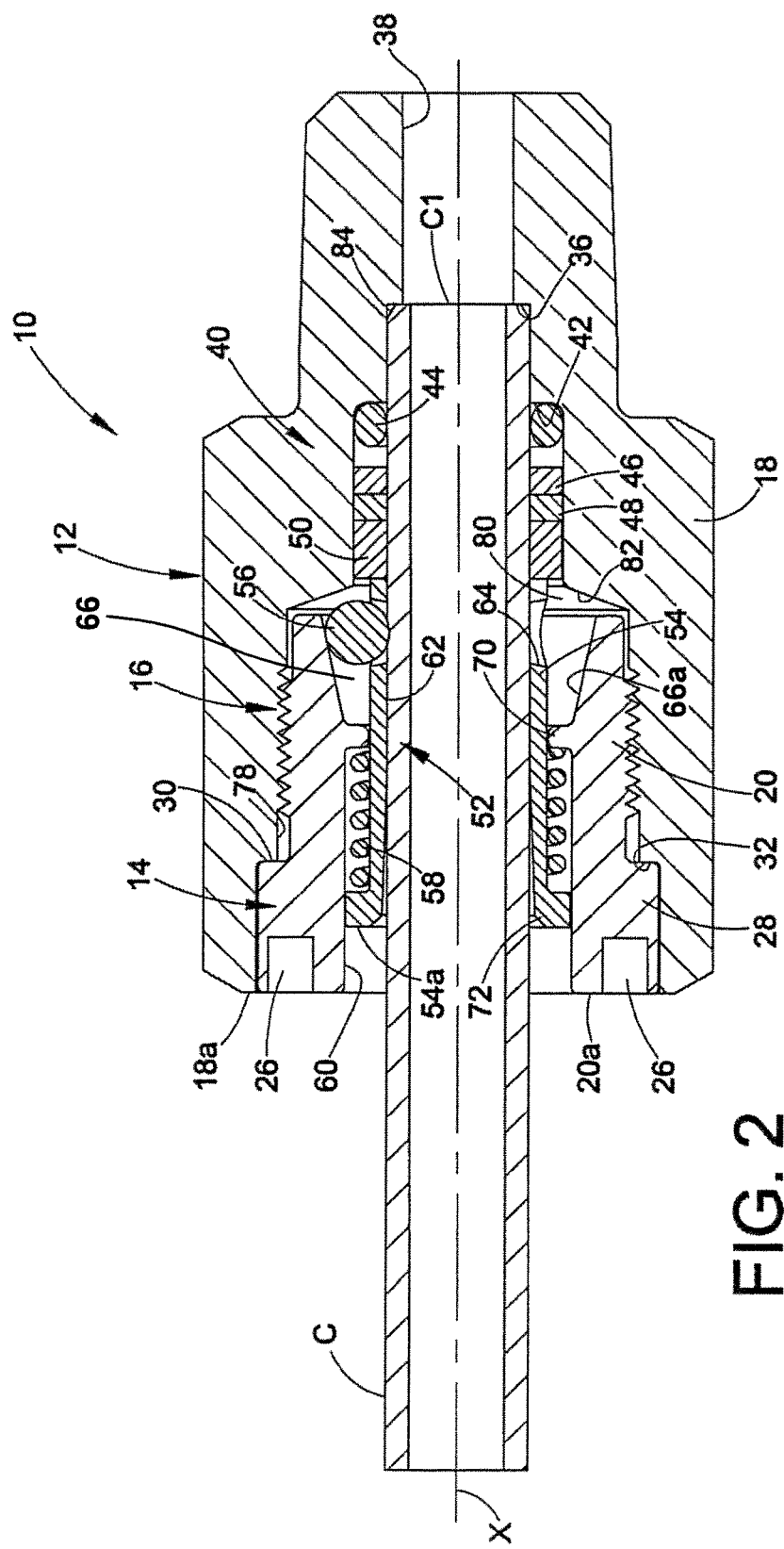
FIG. 2 is the fitting assembly of claim 1 in longitudinal section.
Figure 3:
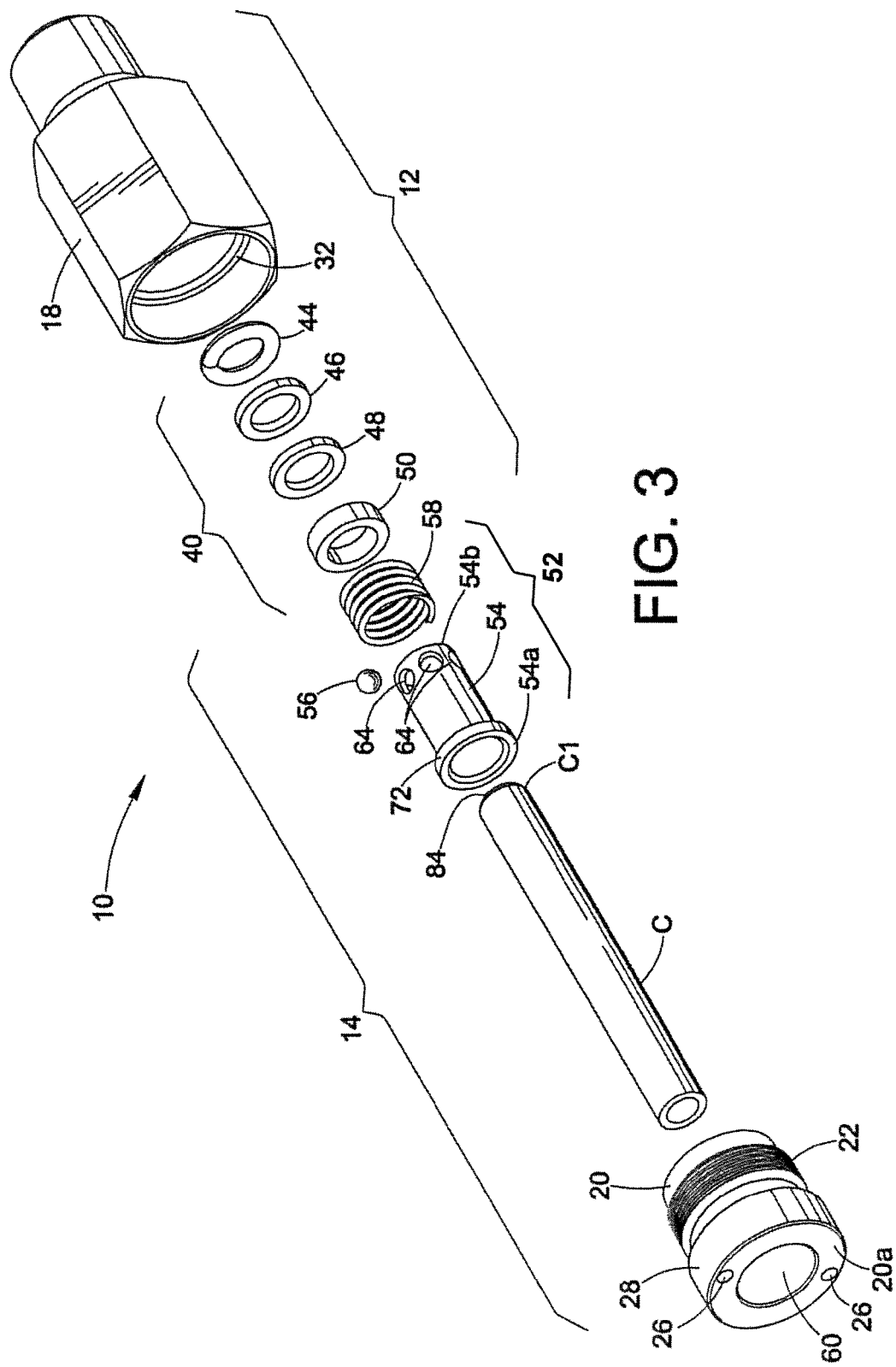
FIG. 3 is an exploded isometric of the fitting assembly of FIG. 1 including the conduit.

With reference to FIGS. 1-3, an embodiment of a fitting assembly 10 is represented. The exemplary fitting assembly 10 provides for or allows single action push to connect operation. By single action is meant that a conduit C, and in particular the end portion C1 of the conduit end C, can be inserted into the fitting assembly 10 with a single dimensional or directional movement or action, and when fully inserted the conduit C is sealed against fluid pressure and is retained in position. The axial insertion may be performed manually or by a tool or machine. By push to connect is meant that the single action may be a simple axial movement or push along the longitudinal axis of the conduit C and that this single action is the only action needed to complete the mechanical connection between the conduit C and the fitting assembly 10. No subsequent or additional motion or action is needed to complete the mechanical connection and fluid tight seal. In an exemplary embodiment, the single directional action or movement is an axial movement along a longitudinal axis of the conduit C. No other or additional or subsequent manual or tool action or movement of the fitting assembly 10 components is needed to achieve conduit seal and retention. Thus, a single action push to connect fitting is distinguished from a traditional fitting assembly that typically is pulled-up or tightened to effect conduit grip and seal by relative movement of the fitting assembly components after insertion of the conduit; for example, a body and a nut that are joined by a threaded mechanical connection and pulled-up by relative rotation of the body and nut, or by being clamped together without a threaded mechanical connection.

Herein, the terms axis or axial and derivative forms thereof refer to a longitudinal axis X along which a conduit C will be inserted and retained. Reference to radial and radial direction and derivative terms also are relative to the X axis unless otherwise noted. In the illustrated embodiments, the axis X may be the central longitudinal axis of the conduit C which also may but need not correspond with or be coaxial with the central longitudinal axis of the fitting assembly 10. The conduit C may be any conduit that defines a flow path FP for system fluid that is contained by the conduit C and the fitting 10. The inventions and embodiments described herein are particularly suitable for metal conduit such as metal pipe or tube, however, non-metal conduits may also be used as needed. The conduit C may have any range of diameter size, for example, 1/16th inch or less to 3 inches or greater in diameter and may be in metric or fractional sizes. The conduit C may also have any range of wall thickness that allows for an axial insertion into the fitting assembly 10.

The fitting assembly 10 may include two discrete sections or subassemblies. In an embodiment, the fitting assembly 10 may include a first fitting component or subassembly 12 and a second or fitting component or subassembly 14. The first fitting component 12 and the second fitting component 14 may be joinable or mate together in any manner suitable for the application or use of the fitting assembly 10. For example, the first fitting component 12 and the second fitting component 14 may be joinable together using a threaded mechanical connection 16 (FIG. 2.) Many other mechanical connections may alternatively be used, including but not limited to a clamped connection or bolted connection or crimped connection, to name three examples, or non-mechanical connections may be used, for example, a weldment.

Note that although the conduit C is shown in FIG. 3, the conduit C is not considered to be part of the second fitting component 14.

FIGS. 1-3 illustrate the fitting assembly 10 in a fully assembled condition, and further with the conduit C fully inserted or seated in the fitting assembly 10. In this position, the conduit C is sealed and retained in position, especially against fluid pressure, although the fitting assembly 10 may be used in low or zero or negative pressure applications.

Figure 4:
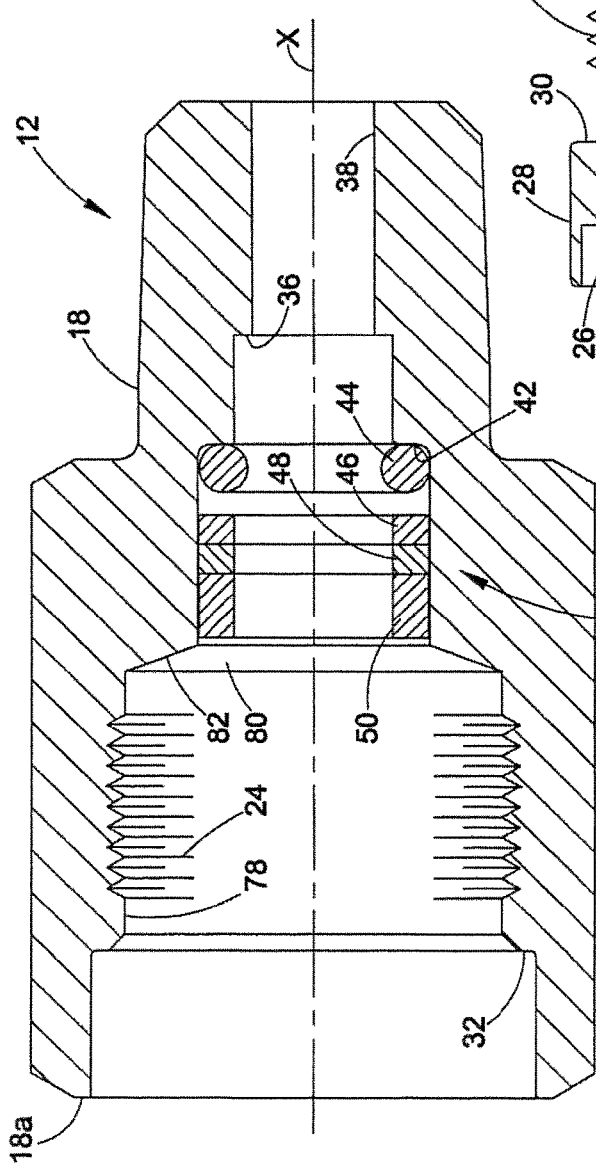
FIG. 4 is an embodiment of a first fitting component subassembly that may be used in the embodiment of FIGS. 1-3 in longitudinal section.
Figure 5:
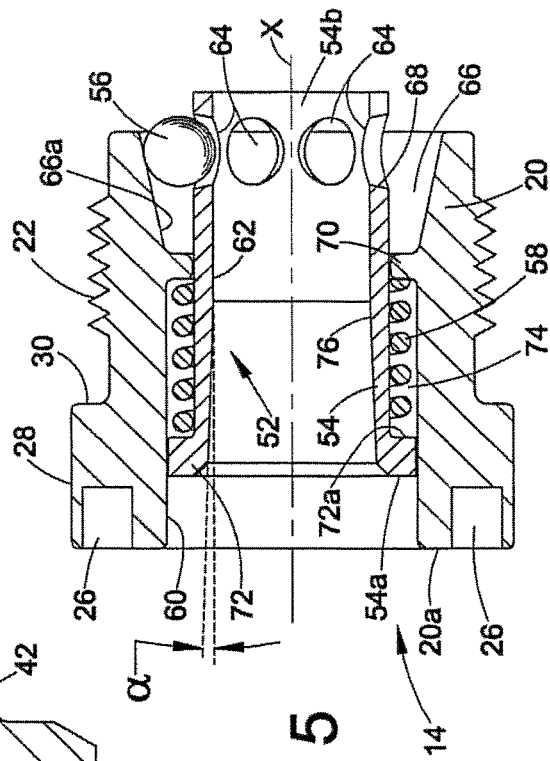
FIG. 5 is an embodiment of a second fitting component subassembly that may be used in the embodiment of FIGS. 1-3 in longitudinal section.

With additional reference to FIGS. 4 and 5, the first fitting component 12 may be realized as a body subassembly. The first fitting component may include a body 18 that is adapted to receive the conduit end C1. Although it is common to call the conduit receiving fitting component a body in fitting terminology, the first fitting component 12 may use a fitting component other than what might be considered a fitting body. Also, the body 18 need not be a standalone component, but alternatively may be formed as a cavity in a block, for example a manifold or a valve body to name a couple of examples. Such body embodiments are commonly known in the art as a port or a ported fitting.

The second fitting component 14 may be realized as a nut subassembly. The second fitting component 14 may include a nut 20 through which the conduit end C1 passes into the body 18. Although it is common to call the mating second fitting component 14 a nut in fitting terminology, the second fitting component 14 may be a fitting component other than what might be considered a fitting nut.

Although the exemplary embodiment illustrates a male threaded nut 20 having male threads 22 and a female threaded body 18 having mating female threads 24, an alternative would be to have the nut 20 be female threaded and the body 18 be male threaded. And as noted above, the body 18 and the nut 20 may be joinable by many different techniques, including a mechanical connection other than a threaded mechanical connection 16. Moreover, the body 18 and the nut 20 may be made of any suitable material, for example stainless steel or other metal, or may be made of non-metals, for example plastics or polymers or composite materials or other suitable materials, as needed. For embodiments in which the conduit C is stainless steel or other metal, the body 12 and the nut 14 are preferably made of metal and more preferably stainless steel alloy. Also, in additional embodiments, the body 12 and the nut 14 are preferably all metal.

The nut 20 may include two or more pin holes 26 that can be used to receive a tool that is used to drive the nut 20 into the body 18, for example by rotation of the nut 20 relative to the body 18 about the axis X. It will be noted that the axial dimension of the nut 20 may be selected so that the outboard end 20a of the nut 20 appears flush with the outboard end surface 18a of the body 18, when the nut 20 is fully tightened, but this flush arrangement is optional. The nut 20 may also include a flange 28 having an end surface 30 that engages a first counterbore surface 32 in the body 18. This engagement between the nut end surface 30 and the body first counterbore surface 32 provides a positive stop to further tightening of the nut 20 relative to the body 18 thereby preventing over-tightening. As best viewed in FIG. 1, the body 18 may include wrench flats 34, for example hex flats, to assist in tightening the body 18 and the nut 20 together when a threaded mechanical connection is used.

The body 18 may include an optional second counterbore or socket 36 that is adapted to receive the conduit end C1. The second counterbore 36 of the body 18 may be used as a positive stop during insertion of the conduit C into the fitting assembly 10 so that the assembler can sense that the conduit C is preferably fully inserted and seated against the counterbore 36 shoulder (see FIG. 2.) However, many other techniques may alternatively be used to control or delimit the axial distance that the conduit C is inserted into the fitting assembly 10. The body 18 may include a flow passage or bore 38 for fluid that passes through the conduit C and the fitting assembly 10. Alternatively, the body 18 may be formed as a cap or plug with the flow passage 38 omitted.

The body 18 and nut 20 together define an interior cavity that retains a seal device 40 that establishes a fluid tight seal against fluid pressure between the outer surface of the conduit C and the body 18 when the conduit is inserted into the outboard end of the fitting body. The body 18 may include a third counterbore 42 that delimits a socket that receives the seal device 40, and as such the body 18 and the seal device 40 form the first fitting component 12. The third counterbore 42 helps to retain the seal device 40 in position when the conduit C is inserted into the fitting assembly 10. The seal device 40 may comprise a single seal member or alternatively multiple seal members as shown in FIGS. 2, 3 and 4. For example, the seal device 40 may include a primary seal member 44 such as, for example, an elastomeric o-ring style seal. Many different primary seal member designs and materials may alternatively be used, including but not limited to a halogen polymer (for example, PTFE), carbon (for example, expanded graphite), soft metal (for example, silver), spring metal (for example, X750, 17-4PH.) The seal device 40 may further include one or more optional backing rings 46, 48 which may be used as needed to help reduce extrusion of the softer primary seal 44 under pressure. The backing rings 46, 48 may be made of a harder plastic material, for example PTFE or PEEK as compared to the primary seal member 44. An optional gland 50, which may be metal or other suitable material as needed, may be used to reduce or prevent damage to the seal device 40 due to contact with a retainer (described below) and also to help retain the seal device 40 in position as part of the first fitting component 12. The primary seal member 44 provides a fluid tight seal for the fitting 10 by being compressed against the outer surface of the conduit C and one or more surfaces of the third counterbore 42 or socket in which the seal member 44 is disposed within the body 18. The seal device 44 therefore provides a primary body seal to contain fluid within the fitting 10 so as to prevent fluid that is in the conduit C from escaping to the ambient or surrounding environment. The body seal and the conduit seal are effected when the conduit C has been inserted axially into the body 12 sufficiently so as to pass through the primary seal member 44.

The fitting components 12, 14 may be assembled with a retainer 52 operable to grip and lock or otherwise retain the conduit C with fitting assembly when the conduit C has been sufficiently inserted axially into the fitting assembly 10 so as to engage the retainer 52. It will be noted from the following description that the retainer 52 can grip and retain the conduit C with the nut 20 at an axial position that is less than a full insertion used to achieve conduit seal by the seal device 40. The conduit C can optionally even be retained with the nut 20 when the nut 20 has not been assembled to the body 18.

In an embodiment (see FIG. 5) the retainer 52 may be a subassembly comprising a retainer body 54 (e.g., a ball cage or carrier), at least one conduit gripping member or bearing member 56 and a biasing member 58. Although the ball cage 54 and the conduit gripping member 56 are shown as two distinct parts, alternatively other retainer designs may be used that would integrate this functionality into a single part, further optionally including the functionality of the biasing member 58. The conduit gripping member 56 may be realized in the form of one or more substantially spherical balls 56, although other conduit gripping member shapes and designs may alternatively be used as needed. In FIG. 5 the conduit gripping member 56 appears to be displaced out of contact with the ball cage 54 even though there is no conduit it FIG. 5. This is done for clarity and understanding of the structure. Those skilled in the art will readily understand that when the conduit C is not positioned in the retainer 52 the balls 56 drop partially into the ball cavities 64 as explained further below.

FIGS. 4 and 5 thus illustrate an embodiment in which the first fitting component 12 is a standalone subassembly and the second fitting component 14 is also a standalone subassembly. The first fitting component 12 and the second fitting component 14 when assembled or joined together thus provide or form the fitting assembly 10. The fitting assembly 10 therefore is a simple two part assembly which can simplify assembly and use in the field. The first fitting component 12 and the second fitting component 14 may be assembled together at the manufacturer, a distributor or by the end user. After the first fitting component 12 and the second fitting component 14 have been assembled together, the fitting assembly 10 provides a complete single action push to connect fitting by which all that is needed to make a mechanical connection with a conduit end, as well as seal the conduit end against fluid pressure, is to push the conduit end into the fitting assembly 10 until the conduit end preferably bottoms against the second counterbore 36 or alternatively is axially inserted into the fitting assembly so that the seal device 40 engages with the outer surface of the conduit C. The conduit C may be inserted manually or alternatively by use of a tool or a machine or other convenient means. Insertion of the conduit C into the fitting assembly 10 makes the mechanical connection and the fluid tight seal between the conduit C and the fitting assembly 10 without any required subsequent or further or additional action or motion.

The ball cage 54 may be adapted to move or shift axially within a central bore 60 of the nut 20. The ball cage 54 includes a through bore 62 that preferably is at least cylindrical partially admits insertion of the conduit C into the fitting assembly 10 (FIG. 2) with a preferably close fit. An inward end portion 54b of the ball cage 54 includes one or more ball cavities 64 that position or trap the balls 56 within a preferably tapered wall cavity 66 of the nut 20. The tapered wall cavity 66 of the nut 20 is delimited by a tapered wall 66a that preferably is frusto-conical, but alternatively other geometric shapes and forms may be used as needed. Note that in FIG. 5 as well as FIGS. 2 and 8 for clarity we only show one ball 56, but in practice there may be a ball 56 in each ball cavity 64 or fewer balls 56 may be used, although preferably there will be at least three balls used. Each ball cavity 64 may include a beveled or shaped ball cavity wall or surface 68 that may be sized and beveled or shaped to prevent the associated ball 56 from falling through the ball cavity 64. However, each ball cavity 64 is preferably sized so that at least a portion of each ball 56 protrudes through the associated ball cavity 64 so as to make contact with the conduit C outer surface (see FIGS. 2 and 6).

The balls 56 may be made of any suitable material as needed, preferably made of metal especially when used with a metal conduit C, and more preferably made of stainless steel.

The central bore 60 of the nut 20 may include a radially inward projecting rib 70 and the outboard end 54a of the ball cage 54 may include a radially outwardly projecting flange 72 that presents an inner surface 72a that faces towards the rib 70. The flange 72 and the rib 70 along with the central bore 60 of the nut 20 define a pocket 74 that receives the biasing member 58. The biasing member 58 may be realized in the form of a coiled spring as shown, however, many other types of biasing members may alternatively be used. The spring or biasing member 58 is compressed in the pocket 74 so as to apply an outwardly directed axial force on the ball cage 54. By outwardly is meant in an axial direction away from the conduit end C1. The ball cage 54 is able to move or shift axially although the movement or shift may be slight and perhaps imperceptible by visual or tactile feedback. The axial bias produced by the spring 58 forces the balls 56 that sit in the ball cavities 64 in towards the radially narrower portion of the tapered wall cavity 66 such that the balls 56 engage the tapered wall 66a and are trapped against the tapered wall 66a because of the limited radial movement permitted by the ball cavities 64. The trapped balls 56 thus also prevent the spring 58 from pushing the ball cage 54 out through the nut central bore 60.

It will be noted that the amount of axial movement or shift of the ball cage 54 will be a function of a number of design factors including the size of the balls 56 relative to the size of the tapered wall cavity 66. The biasing member 58 thus serves to maintain the retainer 52 with the nut 20 as a complete subassembly of the second fitting component 14. Also note that in FIG. 2 (as well as FIG. 8) the spherical ball 56 is shown centered in the respective ball cavity 64, but this is an artifact of the drawing model. In practice, the biasing member 58 axially biases the ball cage 54 outwardly so as to wedge the balls 56 between the tapered wall 66a and the outer surface of the conduit C. The balls 56 therefore would be in contact with the forward or inward portion of the ball cavity wall or surface 68 that delimits the ball cavity 64.

Figure 6:
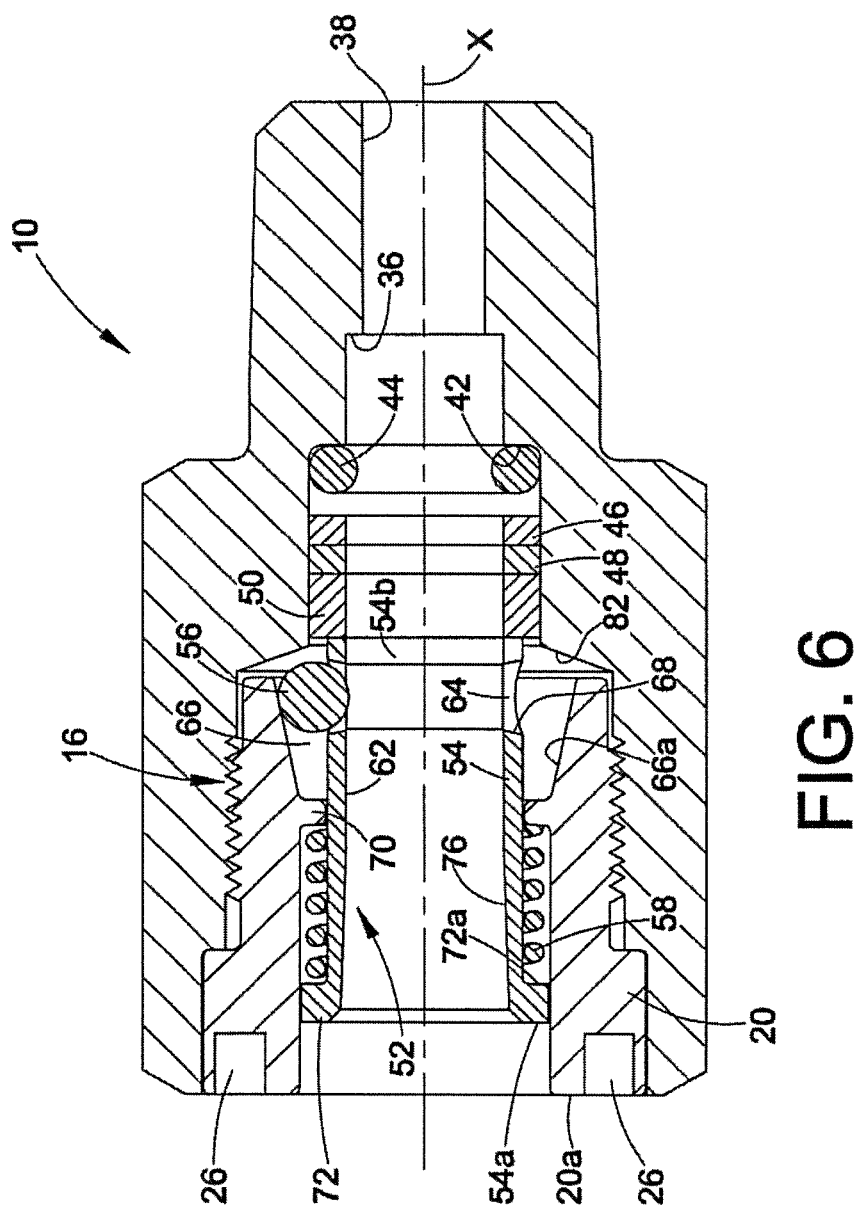
FIG. 6 is the fitting assembly of FIG. 2 shown in longitudinal section prior to insertion of the conduit C into the fitting assembly.
Figure 7:
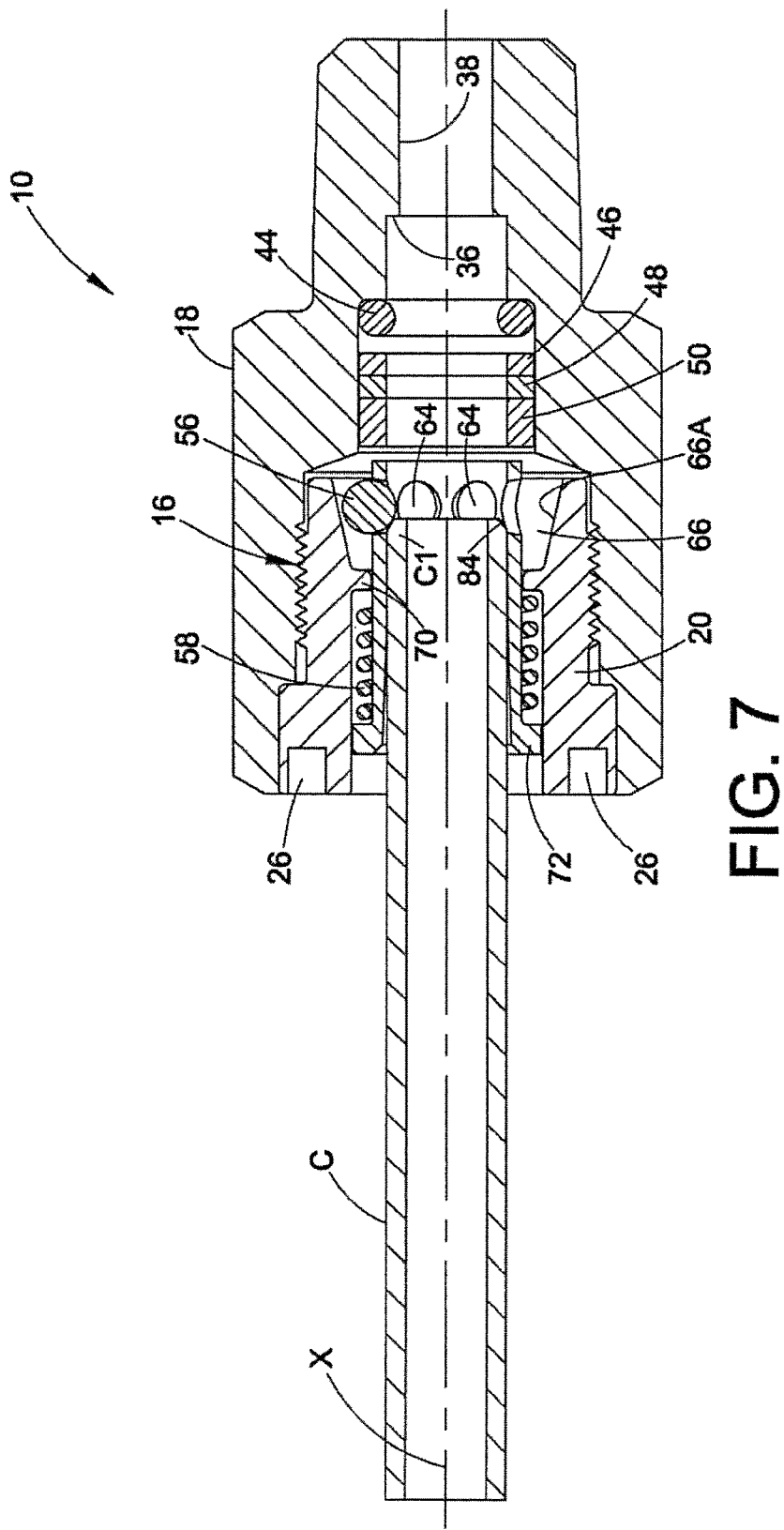
FIG. 7 is the fitting assembly of FIG. 2 shown in longitudinal section with partial insertion of the conduit C into the fitting assembly.

With reference to FIGS. 6 and 7, as the conduit C is inserted into the fitting assembly 10, the conduit end C1 will contact or engage the balls 56 which partially protrude through the ball cavities 64. The initial contact of the conduit end C1 with the balls 56 is shown in FIG. 7. As the conduit end C1 is further inserted, the balls 56 and the ball cage 54 are moved or shifted axially inward against the force of the spring 58 so that the balls 56 can be radially displaced further (by a rolling action of the balls 56 on the outer surface of the conduit C) into the ball cavities 64 and the tapered wall cavity 66 so as to allow the conduit end C1 to be fully inserted into the second counterbore 36 of the body 18. This movement occurs due to frictional engagement between the balls 56 and the conduit end C1 outer surface. This same frictional engagement helps to prevent the conduit C from simply being pulled out once it has engaged with the balls 56. The conduit end C1 may include a chamfer (84 in FIG. 2) to facilitate initial contact with the balls 56. The amount of axial and radial shift or movement of the balls 56 may typically be rather small and just enough so as to allow the conduit end to be inserted fully. All that is needed is enough movement to release load of the balls 56 against the conduit so that the conduit freely slides into the fitting 10. Conduit insertion may be done by any convenient means or technique, including but not limited to hand-held manual insertion, use of a tool to assist with manual insertion or machine insertion.

When the conduit C has been fully inserted into the second counterbore 36 of the body 18 as represented in FIG. 2, the retainer 52 has an axial position within the nut 14 such that the balls 56 are in contact with the conduit C and the tapered wall 66a due to the bias of the spring 58. We refer to this axial position of the retainer 52 to be the first axial position within or relative to the fitting assembly 10 and that is the axial position for gripping and retaining the conduit C in the fitting assembly 10 to constrain the conduit C from axial withdrawal from the conduit fitting 10. Thus, the balls 56 are wedged and trapped and cannot move radially or axially, thereby exerting a retaining force and tight grip on the conduit C. The biasing member 58 maintains the balls 56 in contact with the tapered wall 66a and the conduit C outer surface, thereby applying a retaining force or load against the conduit C to resist axial withdrawal of the conduit C from the fitting 10. The balls 56 resist axial withdrawal of the conduit C from the ball cage 54 and the more force that is applied to the conduit C to pull it out the stronger is the gripping force and retention due to the wedging action of the balls 56 trapped between the conduit C outer surface and the tapered wall 66a. The friction and radial load between the balls 56 and the conduit outer surface prevents axial movement of the conduit back out of the fitting 10 and this load will increase if an axial force is applied to the conduit C to try to pull the conduit C back out of the fitting 10. Note that the conduit C is trapped in this position in the ball cage 54 even if the nut 14 is not installed in the body 18 (although in that circumstance the conduit can be pushed forward but not pulled rearward, and the spring 58 will prevent the conduit C and the ball cage 54 from falling apart.)

Note also that fluid pressure, from system or working fluid in the conduit C, acting on the seal device 40 (with or without the optional gland 50) and/or an end face of the conduit end C1 will tend to increase axial forces against either the ball cage 54 or the conduit C or both towards the reduced sized portion of the tapered wall cavity 66. These axial forces due to fluid pressure will tend to further increase the compression of the balls 56 against the tapered wall 66a, thus also increasing the grip and retention of the conduit C by the balls 56. It is contemplated that the balls 56 may comprise a harder material than the conduit C so that the balls 56 may actually indent into the outer surface of the conduit C, further increasing resistance to the conduit C being axially withdrawn or forced out of the fitting 10.

However, the conduit C can be easily withdrawn or pulled out of the retainer 52, for example the ball cage or retainer body 54, by simply applying an axially inward force against the ball cage 54 and the biasing force of the spring 58, for example, by pushing against the flange 72 such as by applying a force against the outboard end 54a of the ball cage. By pushing on the ball cage 54 against the force of the spring 58, the ball cage 54 can be moved or shifted axially forward (as viewed in FIG. 2) to another axial position within the fitting assembly 10 at which the compression on the trapped balls 56 against the conduit C is reduced enough so that the conduit C can be axially withdrawn or removed from the fitting assembly 10. We refer to this axial position of the retainer 52, that is sufficient to reduce the compression on the trapped balls 56 to allow withdrawal of the conduit C, as the second axial position of the retainer 52 within the fitting assembly 10. Again, this movement or shift of the retainer 52 may be slight so as to release the stress on the balls 56. Thus, the retaining force of the balls 56 against the conduit C is lessened and the conduit C will easily slide back out of the fitting assembly 10. The fitting 10 design also allows of repeated re-use, also known as remake, of the fitting, either with the same conduit or a different conduit.

An axially inward force may be applied against the flange 72 of the ball cage 54 either manually such as with fingers or optionally with a tool (not shown). From FIG. 2 it will be noted that an embodiment of the ball cage 54 has the outboard end 54a axially recessed in the nut 20. If the recess is deep, a tool might be used to push on the ball cage 54. Alternatively, the recess may be shallow enough that fingers or a tool could be used to push on the outboard end 54a. As another alternative, the ball cage 54 may be axially sized so as to position the outboard end 54a either flush, about flush or slightly outside of the nut 20, in any case making it easier to contact the ball cage 54 with a tool or fingers to displace the ball cage 54 so that the conduit C can be withdrawn. Preferably, fluid pressure will be reduced to ambient pressure before the retainer 52 is acted on to allow the conduit C to be withdrawn.

Note further that although preferably the conduit gripping portion, whether in the form of one or more spherical balls or other form, becomes wedged or trapped between the conduit C outer surface and a preferably tapered surface 66a, other surface geometries or additional components may be used that compress the conduit gripping device 56 against the conduit C to constrain axial withdrawal of the conduit C. It is preferred, whatever technique or structure is used to constrain the conduit C in the fitting assembly 10, that there be a first position and a second position, that can be selected from outside the assembled fitting 10 (for example in the exemplary embodiment pushing the retainer 52 to the second axial position), to release the conduit C for withdrawal from the fitting assembly 10, without necessarily having to loosen or separate the first fitting component 12 and the second fitting component 14.

Note from FIG. 2 that when the ball cage 54 is pushed inward against the force of the spring 58, the distal end of the ball cage 54 could contact the optional gland 50, so that gland 50 helps protect against damage to the seal device 40 in such an event.

An outwardly extending portion 76 of the ball cage 54 inner diameter through bore 62 optionally may be outwardly tapered so as not to apply stress to the conduit C (which can cause fretting) when possible system vibration may impart rotary flex or oscillation of the conduit C. The taper angle α and the length of the tapered portion 76 need only be large enough to reduce or prevent stress being applied to the conduit C by the ball cage 54. This will cause the stress from conduit oscillation or vibration to be concentrated more at the balls 56.

The ball cavities 64 and the balls 56 may be evenly spaced circumferentially from each other in the ball cage 54 so as to further reduce potential damage to the conduit caused by vibration and oscillation of the conduit. An even or uneven number of balls 56 may be used. A benefit of an uneven number of balls 56 is that no two balls will be diametrically opposed to each other when the balls 56 are in position in the ball cage 54.

With reference to FIGS. 2 and 5, the body 18 includes a partially threaded cylindrical bore 78 in which the female threads 24 (FIG. 4) may be formed. This bore 78 may include a fourth counterbore 80 with a tapered shoulder 82. This tapered shoulder 82 may be used to provide additional space for movement of the balls 56 when the ball cage 54 is axially shifted to allow a retained conduit C to be removed. Note also that the conduit end C1 may include the chamfer 84 to reduce or prevent damage to the seal device 40 when the conduit C is inserted into the fitting assembly 10.

Further note that preferably but not necessarily the seal device 40 is axially disposed between the conduit end C1, which is the fluid pressure head, and the retainer 52, with the conduit C being inserted from the retainer side of the fitting assembly 10. In other words, during assembly the conduit C is inserted into the fitting assembly 10 preferably from the axially outward side or end of the retainer 52 (from the left as viewed in FIGS. 2, 6 and 7) and passes through the axially opposite side or end of the retainer 52 before the conduit end C1 engages with or passes through the seal device 40. The conduit therefore is inserted into the fitting assembly 10 preferably from the biasing member side of the retainer 52. This allows easier assembly and retention of the seal device 40 with the fitting body 18 as a subassembly and also helps reduce or prevent system fluid wetting of the retainer 52, for example, the spring 58.

Figure 8:
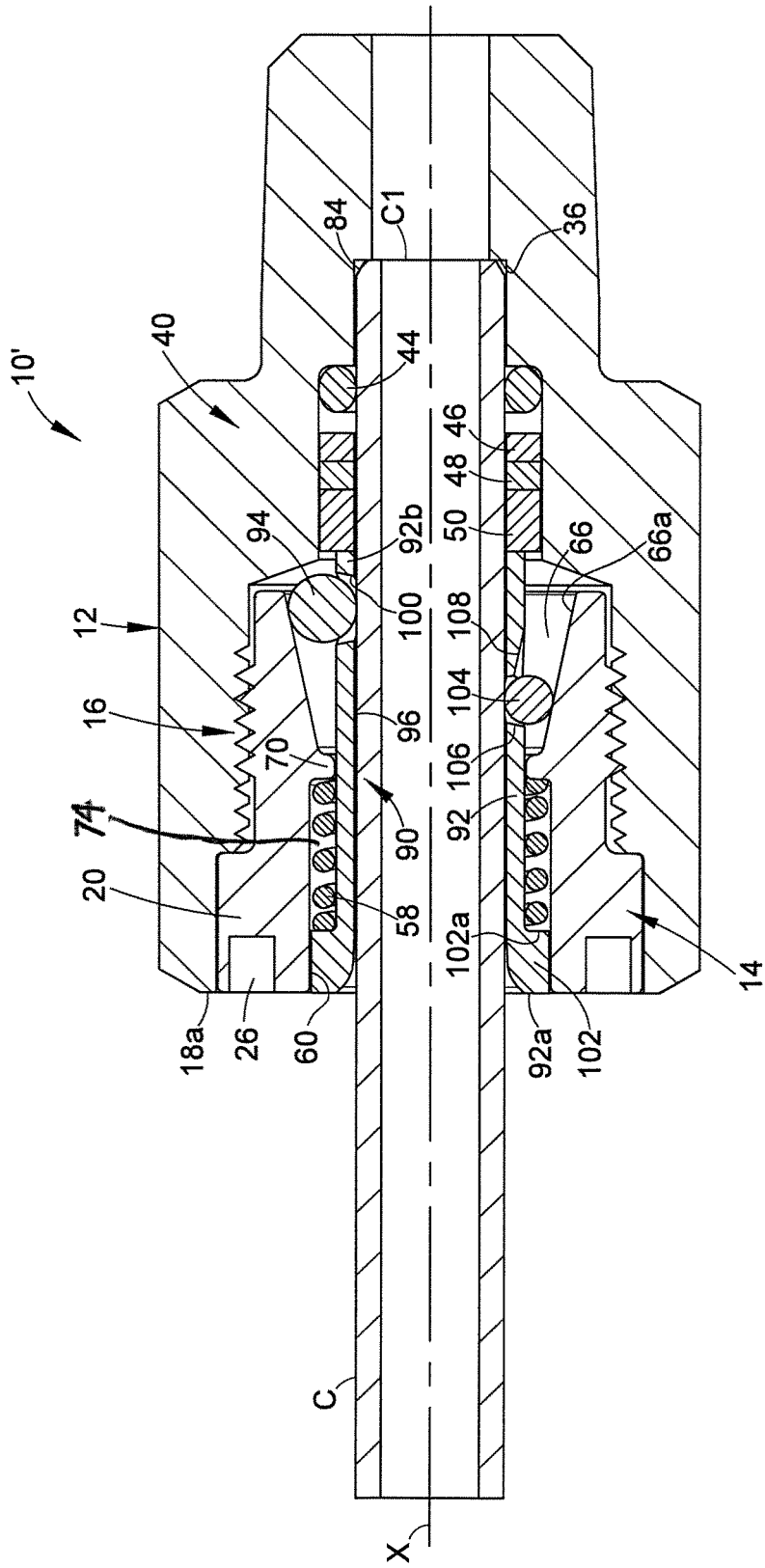
FIG. 8 is another exemplary embodiment of a fitting assembly in longitudinal section.
Figure 9:
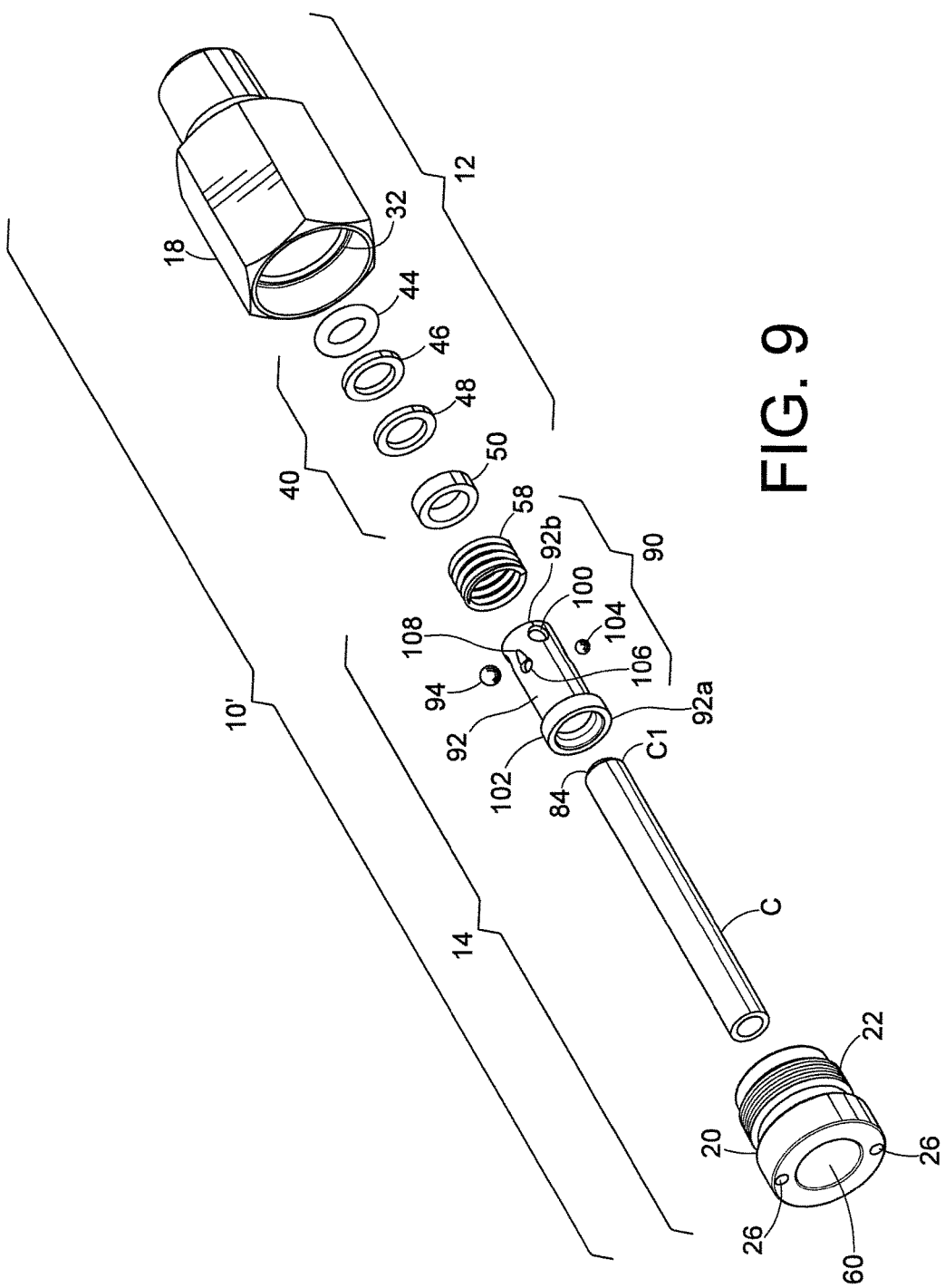
FIG. 9 is an exploded isometric of the fitting assembly of FIG. 8 including the conduit.

FIGS. 8 and 9 illustrate another embodiment of a single action push to connect conduit fitting 10'. In this embodiment, most of the components and parts of the fitting 10' may be but need not be the same as the embodiment of FIGS. 1-7 above. Therefore, like reference numerals are used for like parts and the description of the parts need not be repeated. Note again that although the conduit C is shown in FIG. 9, the conduit C is not considered to be part of the second fitting component 14.

The embodiment of FIGS. 8 and 9 differs from the embodiments described above in the design of the retainer 90. In an embodiment, the retainer 90 may be a subassembly comprising a ball cage or annular retainer body 92, a conduit gripping portion (e.g., one or more conduit gripping members 94) and a biasing member 58. Although the retainer body 92 and the conduit gripping portion are shown as two distinct parts, alternatively other retainer designs may be used that would integrate this functionality into a single part, further optionally including the functionality of the biasing member 58. The conduit gripping portion may be realized in the form of a first set of one or more preferably spherical balls 94, although other conduit gripping member or bearing member designs may alternatively be used as needed. The retainer body 92 may be adapted to move or shift axially within a central bore 60 of the nut 20. The retainer body 92 includes a through bore 96 that admits insertion of the conduit C into the fitting assembly 10'. An inward end portion 92b of the retainer body 92 includes one or more ball cavities 98 that position or capture the balls 94 within a preferably tapered wall cavity 66 of the nut 20, between the nut and the retainer body. Note that in FIGS. 8 and 9 for clarity we only show one conduit gripping member or ball 94, but in practice there may be a ball 94 in each ball cavity 98 or fewer balls 94 may be used, although preferably there will be at least three balls used. Each ball cavity 98 may include a beveled or shaped ball cavity wall 100 that may be sized and beveled or shaped to prevent the associated ball 94 from falling through the ball cavity 98. However, each ball cavity 98 is preferably sized so that at least a portion of each ball 94 protrudes through the associated ball cavity 98 so as to make contact with the conduit C outer surface.

The central bore 60 of the nut 20 may include a radially inward projecting rib 70 and the outboard end 92a of the retainer body 92 may include a radially outwardly projecting flange 102 that presents an inner surface 102a that faces towards the rib 70. The flange 102 and the rib 70 along with the central bore 60 of the nut 20 define an annular pocket 74 that receives the biasing member 58. The biasing member 58 may be realized in the form of a coiled spring as shown, however, many other types of biasing members may alternatively be used. The spring or biasing member 58 is compressed in the pocket 74 so as to apply an outwardly directed axial force on the retainer body 92. By outwardly is meant in an axial direction away from the conduit end C1, towards the outboard ends of the body and nut. The retainer body 92 is able to move or shift axially although the movement or shift may be slight and perhaps imperceptible by visual or tactile feedback. The axial bias produced by the spring 58 forces the balls 94 that sit in the ball cavities 98 axially outward towards the radially narrower portion of the tapered wall cavity 66 such that the balls 94 engage the tapered wall 66a and are forced radially inward and trapped against the tapered wall 66a because of the limited radial movement permitted by the ball cavities 98. The trapped balls 94 thus also prevent the spring 58 from pushing the retainer body 92 out through the nut central bore 60.

It will be noted that the amount of axial movement or shift of the retainer body 92 will be a function of a number of design factors including the size of the balls 94 relative to the size of the tapered wall cavity 66. The biasing member 58 thus serves to maintain the retainer 90 with the nut 20 as a complete subassembly of the second fitting component 14, even when the nut is disassembled from the fitting body.

According to another aspect of the present application, a single action push to connect fitting assembly may be provided with a colleting portion or other such conduit engaging portion outboard of the gripping portion, for example, to collet or secure the conduit outboard of the gripping portion, thereby isolating the gripped portion of the conduit from flexure or vibration experienced by the conduit.

In the exemplary embodiment, the retainer 90 further includes a second set of bearing members. The exemplary bearing members are substantially spherical balls 104, although other shapes may be used as needed. The second set of spherical balls 104 are preferably smaller in size than the first set of spherical balls 94. The retainer body 92 further includes a second set of ball cavities 106. The second set of ball cavities 106 and the balls 104 may be evenly spaced circumferentially from each other in the retainer body 92 so as to reduce potential damage to the conduit C caused by vibration and oscillation of the conduit. As with the first set of balls 94 that used for gripping the conduit, an even or uneven number of balls 104 may be used. A benefit of an uneven number of balls 104 is that no two balls will be diametrically opposed to each other when the balls 104 are in position in the retainer body 92.

The second set of balls 104 are preferably spaced axially outwardly from or outboard of the first set of balls 94, with the second set of balls 104 also trapped between the tapered wall 66a and the conduit C so as to add rigidity and stiffness to the support of the conduit C, somewhat akin to using two bearings spaced apart to support a rotating shaft. By having the second ball set 104 smaller in diameter than the first ball set 94, the same single uniform tapered wall 66 cavity may be used to retain (and radially inwardly bias) the ball sets and still have the second ball set 104 axially spaced from the first ball set 94. An alternative embodiment may use a non-uniformly (e.g., first and second portions tapered at different angles), but still continuously, tapered wall, or two discontinuous (i.e., separated by a non-tapered surface) tapered surfaces for the two ball sets, or other structures by which the second ball set 104 is trapped between the nut 20 and the conduit C. While the illustrated embodiments show the tapered wall surface as being defined entirely by the nut, in other embodiments (not shown), all or part of the tapered wall surface may be provided on a different fitting component.

The amount of axial separation provided between the first ball set 94 and the second ball set 104 will be based on various factors including but not limited to the loads that are expected on the conduit C and the amount of flex and vibration to which the conduit C may be exposed in use. The second ball set 104 is preferably axially spaced outwardly from the first ball set 94, in a direction away from the conduit end C1. Thus, the second ball set 104 helps to isolate the portion of the conduit gripped by the first ball set 94 from conduit vibration and rotary flex and other environmental stresses that the conduit C may experience during use. In order to help assure that the first ball set 94 provides sufficient conduit grip, the tolerances may be chosen so that during assembly and under the biasing influence of the biasing member 58 on the retainer body 92, the first ball set 94 contacts the tapered wall 66a first or before the second ball set 104 would make such contact. The first ball set 94 indents slightly into the outer surface of the conduit C, which allows for enough axial shift of the retainer body 92 to allow the second ball set 104 to also make contact with the tapered wall 66a for radially inward biased engagement with the inserted conduit C. This indentation, retainer body shift, and second ball set conduit engagement may occur upon initial insertion of the conduit end into the fitting body (e.g., due to sufficient outboard biasing force from the biasing member 58). Alternatively, an additional or external outboard axial load on the fitting assembly (e.g., pulling force applied to the conduit, or an axial load applied by the pressurized seal device) may be necessary to indent the first set of balls 94 into the conduit C sufficiently for second ball set 104 engagement with the conduit.

As an example, for conduit C, nut 20 and balls 94 made of 316 L stainless steel, and quarter-inch nominal outer diameter conduit and nominal wall thickness of 0.035 in., the first ball set 94 may indent into the conduit surface in the range of approximately 0.003 in to 0.004 in and up to approximately 0.008 in. These numbers and ranges are exemplary of course because the actual numbers will be adjusted based on materials used for the retainer parts and the conduit, conduit wall thickness, diameters and so on. The conduit gripping member 56 in the first embodiment (FIGS. 1-7) and the conduit gripping member 94 of the second embodiment (FIGS. 8 and 9) may use this indentation feature into the conduit C outer surface to enhance the ability of the retainer 52/90 to grip and hold the conduit C over and above the friction forces that also work to retain the conduit C, advantageously when the conduit C is under pressure. For embodiments that use two ball sets, the second ball set 104 may also contribute to conduit grip by also indenting into the conduit C outer surface, although this is more likely to be the case under elevated pressures. Conduit grip by the second ball set 104 may be a benefit realized in some designs and applications, but the first ball set 94 preferably is designed to provide sufficient and primary conduit grip and retention, while the second ball set 104 preferably is designed to collet the conduit or to provide isolation of conduit vibration and flex from the first ball set 94.

From FIG. 9 it will be noted that each ball cavity 98 may include an axially extending relief or groove 108. During assembly of the retainer 90 into the nut 20, due to the limited axial movement of the retainer body 92 resulting from the flange 72 contacting the rib 70 (or from the flange and rib fully compressing the biasing member 58), it may be in some cases that the retainer body 92 can only extend just far enough to partially expose the ball cavities 98 to allow the balls 94 to be positioned into the ball cavities 98. The relief or groove 108 allows sufficient room or gap between the tapered wall 66a and the retainer body 92 to allow the second ball set 104 to be assembled into the retainer body 92.

Assembly and operation of the single action push to connect fitting 10' of the alternative embodiment of FIGS. 8 and 9 may be though need not be the same as the first fitting 10 embodiment of FIGS. 1-7 and therefore the description need not be repeated. Features and aspects of the embodiments of FIGS. 1-9 are also described in co-pending U.S. Patent Application Pub. No. 2015/0115602, the entire disclosure of which is incorporated herein by reference.

In other embodiments, a second, outboard conduit engaging portion of a push to connect fitting may be adapted to provide increased surface area contact by the second engaging portion, as compared to the gripping portion, to securely hold or collet this outboard portion of the conduit against radial or lateral movement while reducing or minimizing indentation of the outboard conduit portion. As one example, an outboard conduit engaging or colleting portion may include one or more colleting members shaped to provide increased surface area contact with the exterior surface of the conduit, such as, for example, plates, pads, discs, or bands. The colleting members may include a curved or concave interior surface conforming to the cylindrical exterior surface of the inserted conduit. As another example, an outboard conduit engaging or colleting portion of a fitting may include one or more flexible members having a surface (which may, for example, be a curved surface conforming to the exterior surface of the conduit) that can be radially flexed into colleting engagement with the exterior surface of the inserted conduit.

Figure 10A:
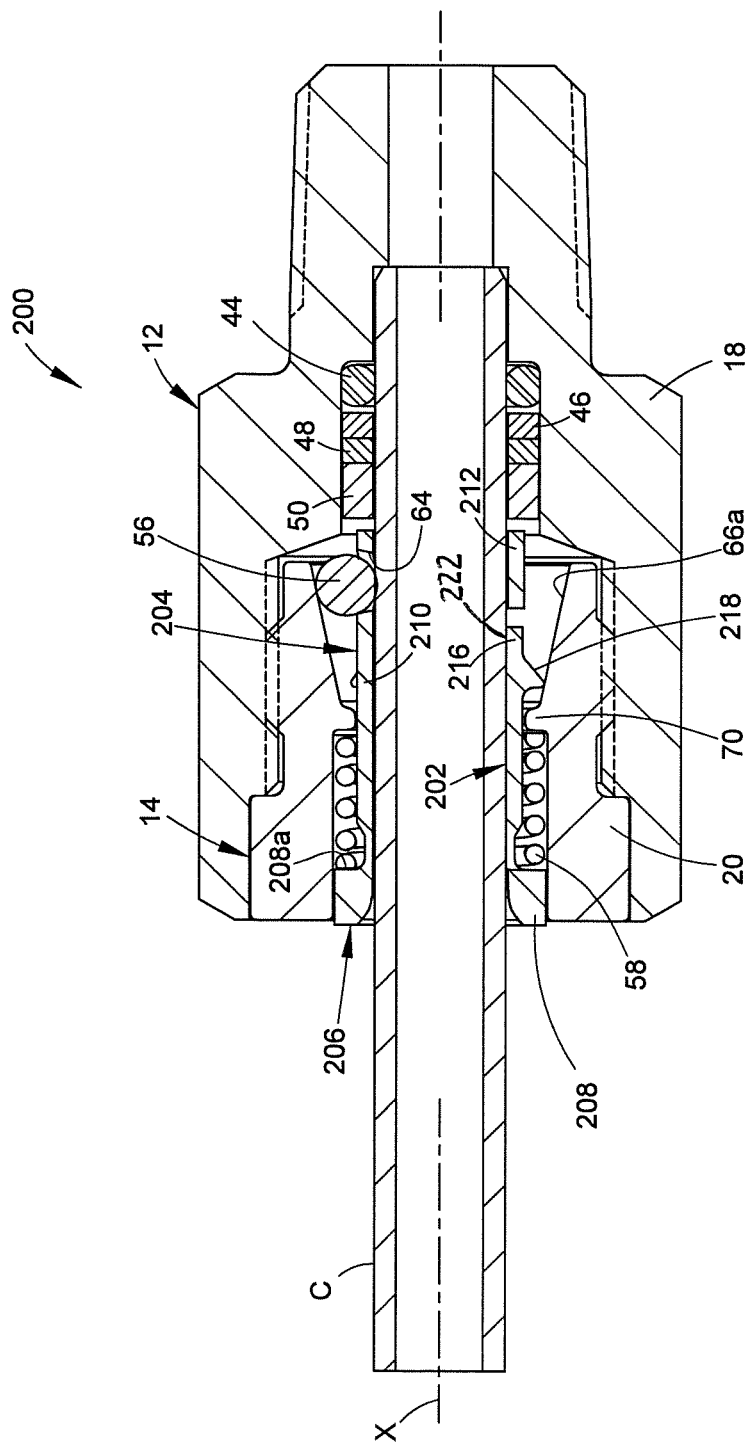
Figure 10B:
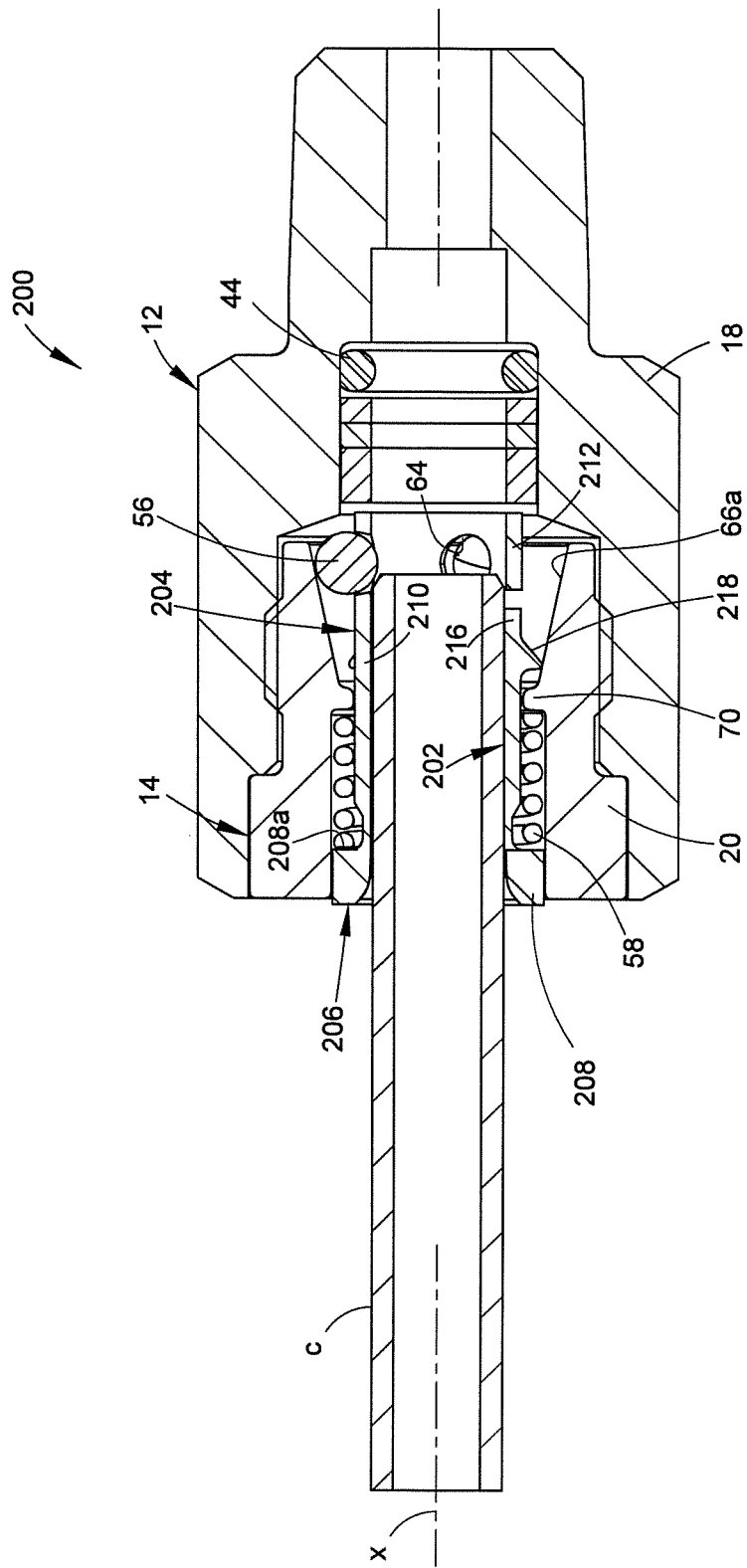
Figure 10C:
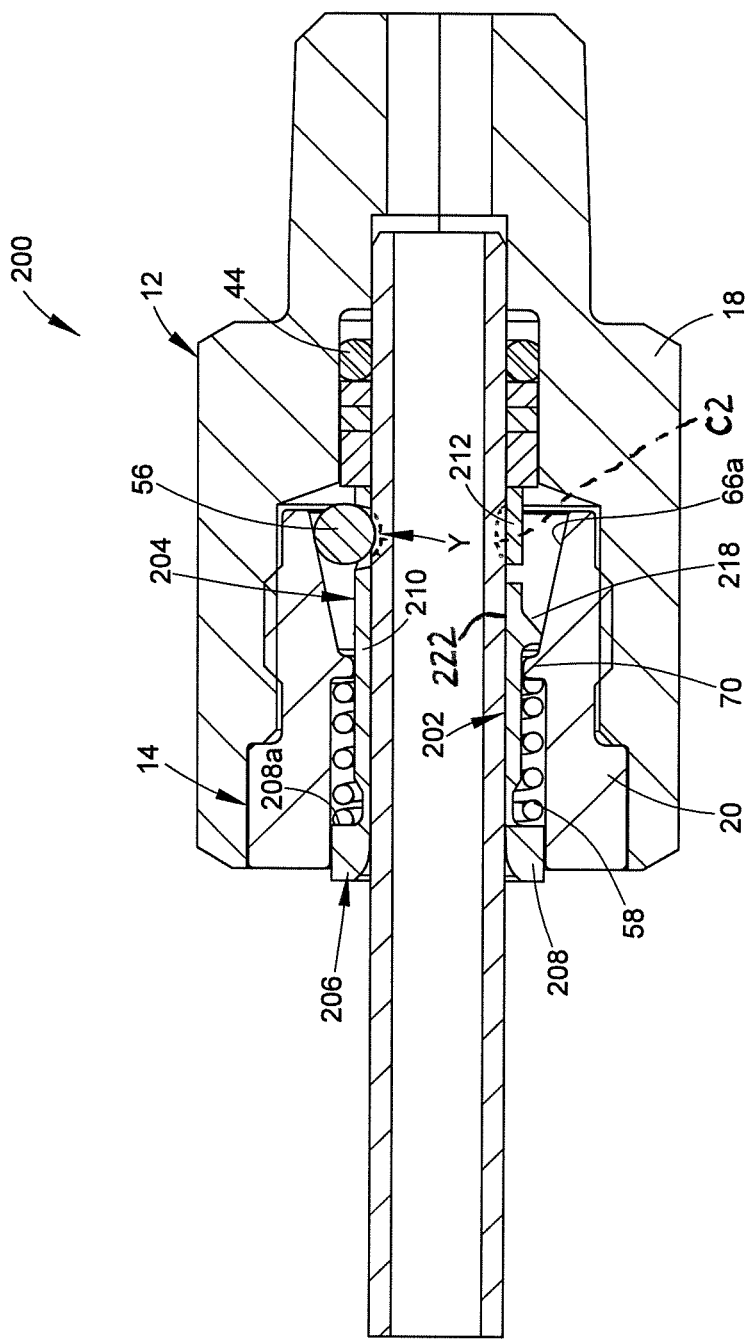

FIGS. 10A-10F illustrate another embodiment of a fitting assembly 200 that provides for a single action push to connect operation as in other embodiments hereinabove. This embodiment may be but need not be similar to the embodiments of FIGS. 1-9 hereinabove except as otherwise noted. Therefore, the overall description does not need to be repeated and like reference numerals are used for like parts. FIG. 10A corresponds with FIG. 2, and shows the fitting assembly 200 with the conduit C fully inserted and retained; FIG. 10B corresponds with FIG. 7, and shows the conduit C partially inserted; FIG. 10C corresponds with FIG. 10A with the fitting assembly under pressure from a working fluid (not shown) contained by the fitting assembly 200; and FIG. 10D corresponds with FIG. 3. FIGS. 10E and 10F are enlarged perspective views of a retainer embodiment.

The principal difference between the embodiments of FIGS. 10A-10F and embodiments of FIGS. 1-9 is the design of the retainer 202, as contrasted with the retainer 52 in FIGS. 1-7 and the retainer 92 in FIGS. 8 and 9. The retainer 202, in addition to functioning as a carrier for the gripping portion (e.g., conduit gripping members or bearing members 56), also provides a second conduit engaging feature or portion (e.g., a conduit colleting feature or colleting portion) by which the retainer 202 collets or otherwise engages the conduit C outboard of the conduit gripping members 56. In one such embodiment, the colleting portion when radially compressed acts as a collet and the colleting action is effected at a location that is axially between the source of the vibration and/or flexure of the conduit and the contact stress points between the conduit gripping devices 56 and the conduit C outer surface. This colleting action thereby provides further support of the conduit C and helps isolate or reduce the effects of the conduit vibration and flexure from the stress points in the conduit caused by the conduit gripping members 56, particularly when the fitting assembly 200 is under pressure. The colleting feature is utilized in additional embodiments in this disclosure.

The retainer 202 (see also FIGS. 10E and 10F) for the fitting assembly 200 in an embodiment may include an annular retainer body 204 (also herein we refer to the retainer body as a ball carrier or ball cage) having at a first, proximal or outboard end portion 206 that includes a radially outwardly projecting flange 208. The flange 208 may be an annular continuous portion that presents an inboard facing wall 208a that cooperates with the inwardly projecting rib 70 of the second fitting component 14, in this example the male threaded nut 20, to retain the biasing member 58 in compression. Two or more wall portions 210 extend axially from the flange 208 to a distal end portion 212. The distal end portion 212 may include one or more ball cavities 64 which retain and position the conduit gripping members 56, capturing the conduit gripping members between the retainer body 204 and the tapered surface 66a of the nut 14. The conduit gripping members 56 may be realized in the form of spherical balls 56, which provide for relatively small surface contact between the conduit gripping members and the outer surface of the conduit, for example, to facilitate gripping indentation of the conduit surface by the gripping members.

For an embodiment of the retainer body 204 having two wall portions 210, the wall portions 210 preferably are diametrically opposed to each other, thereby presenting slots or openings 214 between the wall portions 210 and extending axially towards the distal end portion 212 of the retainer body 204. If more than two wall portions 210 are used, then preferably the wall portions 210 are evenly spaced circumferentially about the retainer body 214. A plurality of radially flexible members or fingers 216 extend in an axial direction (that may be generally parallel with the longitudinal axis X) and in a cantilevered manner from the facing wall 208a. In the illustrated embodiment, the flexible members 216 are integral with the retainer body 204. In other embodiments (not shown), the flexible members may be provided as one or more separate components assembled with the retainer body.

The flexible members 216 extend within a respective slot 214 between adjacent wall portions 210, and there may be one or more flexible members 216 in each slot 214. In an embodiment, each flexible member 216 at a distal end thereof projects radially outward to form an associated tab 218. Each tab 218 may present a radially outer land or end portion 220 that is positioned so as to contact the tapered wall 66a, at least when an outward axial load is applied to the retainer body 204, and a radially inner colleting surface 222 positioned to make direct contact with the outside surface of the conduit C as further described below. Because the retainer 202 is annular, each flexible member 216 may have a curvature that coincides with the overall annular shape of the retainer body 204. Therefore, preferably but not necessarily, each colleting surface 222 is a curved surface that preferably but not necessarily coincides with the curvature of the conduit C, at least when the land 220 is radially pressed against the conduit C outer surface. This arrangement may provide for a larger colleting surface contact area (the combined areas of the conduit contacting surfaces of the flexible member end portions) as compared to the gripping surface contact area (the combined areas of the conduit contacting surfaces of the bearing members).

The biasing member 58, the retainer 202, the balls 56 and the second fitting component 14 in the form of the male threaded nut 20, form a standalone subassembly similar to the embodiment of FIG. 5. This subassembly threadably mates with the first fitting component 12 in the form of the female threaded body 18 to complete the fitting assembly 200.

With reference to FIG. 10B, when the conduit C is withdrawn from the fitting assembly 200, or at least the conduit end is axially inserted up to but not past the position of the balls 56, the biasing member 58 pushes the retainer body 204 axially outward (to the left as viewed in FIG. 10B) but is restrained with the second fitting component 14 because the balls 56 become wedged between the tapered wall 66*a* and the associated ball cavity 64. As the conduit C is further inserted, the balls 56 move axially inward and radially outward along the tapered wall 66*a*, so that the retainer 202 is pushed forward or in an inboard direction. The balls 56 move radially outward until the conduit can move past the balls 56 and be fully inserted in the first fitting component 12 to the position shown in FIG. 10A. This operation may be the same as the embodiment of FIGS. 1-7 above.

Once the tube is fully inserted, the biasing member 58 biases the retainer 202 outboard so that the conduit C is fixed in place by wedging the balls 56 between the tapered wall 66*a* and the conduit C outer surface. When the fitting assembly (with inserted conduit) is not subjected to an additional or external outboard axial load (e.g., pressure from a working fluid contained by the fitting assembly, or a pulling force applied to the conduit), as in FIG. 10A, a radial gap may, but need not, be present between the tab lands 220 and the conduit C outer surface. In other embodiments, the flexible members may be configured to contact an outer surface of the inserted conduit upon conduit insertion, with the biasing force of the biasing member 58 being sufficient to effect colleting engagement of the flexible members with the conduit.

When the fitting assembly 200 is under fluid pressure as illustrated in FIG. 10C, the fluid pressure acts against the seal member 44 which axially applies a load or biasing force against the retainer body 204 in an outboard direction, to bias the gripping portion (balls 56) toward gripping engagement with the conduit, and to bias the colleting portion (flexible members 216) toward colleting engagement with the conduit. This added load cause the balls 56 to indent (or further indent) into the conduit C outer surface by an amount that depends on the amount of fluid pressure. This indentation is illustrated in a somewhat exaggerated manner for clarity and labeled Y in FIG. 10C. The greater the fluid pressure, the greater will be the ball 56 indentation. This indentation also produces a small axial shift or movement of the retainer body 204 relative to the tapered wall 66*a*, which results in the tabs 218 of the flexible members 216 becoming wedged between the tapered wall 66*a* and the outer surface of the conduit C. This wedging action of the tabs 218 produces a radial compression or flexing of the tab lands 220 against the conduit C outer surface which causes a colleting action axially outboard of the balls 56. The colleting action increases radial load on the conduit to enhance conduit support, adds rigidity to the fitting assembly 200 and reduces or helps isolate stress experienced in the area of contact between the balls 56 and the conduit C. Such stress may arise, for example, from conduit vibration and conduit rotary flexure from elsewhere in the fluid system to which the conduit C is connected. The tabs 218 also resist further axial movement of the retainer 202 under pressure so as to increase conduit grip and restrict further compression of the balls 56 into the conduit C surface.

Figure 10D:
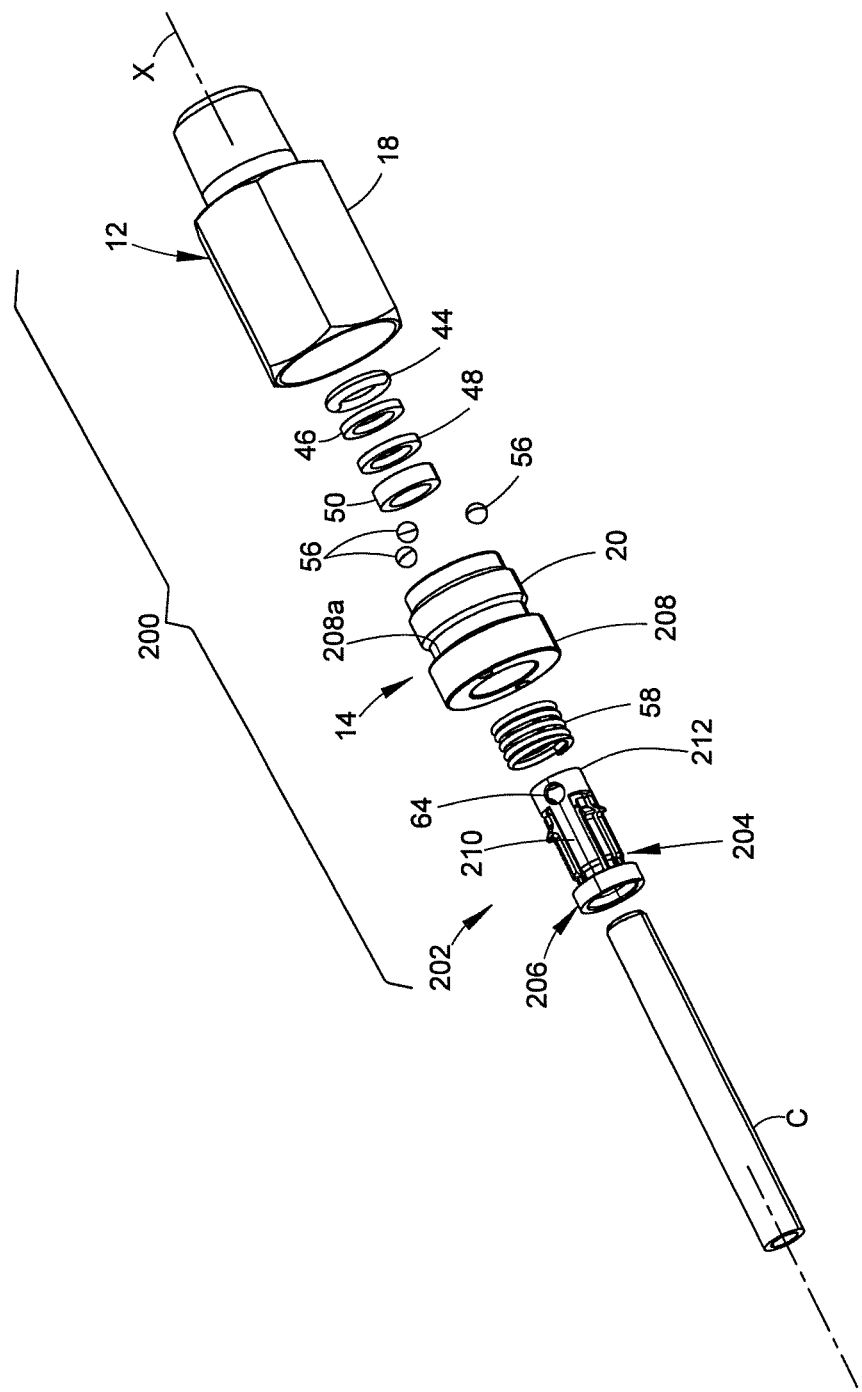

The retainer body 204 preferably but not necessarily is formed as an integral one-piece component, preferably made of metal such as stainless steel to name one example of many. In other embodiments, the gripping portion may likewise be formed from one or more axially extending, radially flexible members, similar to the flexible members of the embodiment of FIGS. 10A-10F, with conduit gripping tabs or end portions shaped to provide gripping (e.g., indenting) engagement of the conduit (e.g., by providing a sharper or smaller conduit engaging surface). FIG. 10D illustrates the fitting assembly 200 in exploded perspective.

In the embodiment of FIGS. 10A-10F, like the embodiments of FIGS. 1-9, the seal device 40 provides a fluid tight seal between the first fitting component (e.g., fitting body) 12 and the inserted conduit C. In other embodiments, a seal device may provide a fluid tight seal between the second fitting component (e.g., fitting nut) and the inserted conduit.

With reference then to FIGS. 11A-11I, we provide other embodiments of a fitting assembly 250 that uses a retainer 270 to provide gripping and colleting actions.

In an embodiment, a fitting assembly 250 includes a first fitting component 252, for example, a female threaded fitting port 252. For example, the port 252 may be a female threaded body 254 that receives the conduit C end and may be a standard SAE configuration.

The first fitting component 252 threadably mates with a second fitting component 256, such as a male threaded nut 258. The male threaded nut 258 includes a tool engaging flange 260 at a distal outboard end thereof. A seal groove 262, for retaining an outer seal 264 that may be, for example, an o-ring, is provided between the flange 260 and the threads 266 of the male threaded nut 258. When the male threaded nut 258 is connected with the female threaded port 252, the outer seal 264 is sealingly compressed between the seal groove 262 and a facing surface 268 of the female threaded body 254. The outer seal 264 therefore provides a body seal for the fitting assembly 250 (e.g., to compensate for the lack of a direct seal between the fitting body and the inserted conduit).

The fitting assembly 250 further includes a retainer 270 which may be an assembly of an annular retainer body or ball carrier 272, one or more conduit gripping members 274, a biasing member 276, a gland 278 and an optional retaining member 280. The conduit gripping members 274 may be realized in the form of spherical balls and the biasing member 276 may be a spring. The ball carrier 272 may be used to position and retain the balls 274 axially aligned with a tapered surface 282 formed in the male threaded nut 258. The ball carrier 272 may include one or more ball cavities 284 that position the balls 274 between the tapered surface 282 and the outer surface of the conduit C. The ball carrier 272 includes at a first end a flange 286 that faces inboard to engage with the biasing member 276. The biasing member 276 is positioned in compression between the flange 284 and an outboard facing surface 288 of the gland 278. The gland 278 further includes an outer peripheral groove 290 that receives the retaining member 280, which may be in the form of a snap ring. The gland 278 presents an inboard facing end surface 292 that engages a seal backing ring 294 which is disposed between the gland 278 and an inner seal 296, which may be realized in the form of an o-ring for example. A second gland 298 is provided to help retain the inner seal 296 in position within the male threaded nut 258.

The retaining member 280 is partially received in and axially aligned with a retainer groove 300 that is provided in the male threaded nut 258. After assembly, the retaining member 280 snaps outward and will interfere with a shoulder 302 of the retainer groove 300. With the ball carrier 272 axially aligned with the tapered surface 282, the ball carrier 272, the biasing member 276, and the gland 278 are retained with the male threaded nut 258 by the retaining member 280 as a subassembly, even when the nut is disassembled from the fitting body. We refer to this configuration as an embodiment of an inverted colleting ball lock concept because the biasing member 276 applies an axial force against the ball carrier 272 to engage the balls 274 with the tapered surface 282 without placing an axial load on the inner seal 296 and minimizing radial interference between the conduit C and the inner seal 296 which could otherwise cause damage to the seal.

The first gland 278 is preferably but not necessarily an annular continuous component, as may be the second gland 298.

With reference to FIGS. 11B and 11C, in two embodiments of the ball carrier 272, 272', the ball carrier 272, 272' may be used to position the balls 274, 274' but also to provide a colleting function as previously described in the embodiment of FIGS. 10A-10F. In one embodiment (FIG. 11B), the ball carrier 272 may include a carrier body 304 having a plurality of preferably circumferentially evenly spaced flexible members 306 that extend axially from the flange 286 and with axial slots 308 therebetween. These flexible members 306 preferably extend in a cantilevered fashion from the flange 286 so as to have radial flexibility. At the distal end of each flexible member 306 is a tab 310 having a radially outer tab land or end portion 311, and a radially inner colleting surface 312 positioned to make direct contact with the outside surface of the conduit C as further described below. Because the retainer body 272 is annular, each flexible member 306 may have a curvature that coincides with the overall annular shape of the retainer body 272. Therefore, preferably but not necessarily, each colleting surface 312 is a curved surface that preferably but not necessarily coincides with the curvature of the conduit C, at least when the land 311 is radially pressed against the conduit C outer surface.

The distinction between the two embodiments of FIGS. 11B and 11C is that in the embodiment of FIG. 11C, adjacent slots 308' extend in opposite directions. This allows greater arcuate land surface area for each tab colleting surface 312' if so needed, for example, to further increase the colleting surface contact area. Also, by having slots extending from the flange 286', the flange 286' has increased flexibility so that the inboard flanged end 286' may also be configured to collet the conduit. In one such embodiment, the flange may be sized to engage the tapered surface 282 for radially inward flexing of the flange end in response to axial outboard movement of the retainer body, to provide a second colleting portion inboard of the gripping portion. Moreover, in an embodiment as illustrated in FIG. 11C, the entire length of the carrier body 304' can collet the conduit C. Also, about the entire circumference of the carrier body 304' there is a portion of the carrier body 304' in colleting contact with the conduit C.

As in the embodiment of FIGS. 10A-10F, the tab colleting surfaces 312, 312' provide the conduit colleting function at a position that is axially between the source of vibration and flexure into the conduit and the stress locations for the balls 274 gripping and indenting into the conduit C. It will be noted that the tabs 310 become wedged between the tapered surface 282 and the outer surface of the conduit C and radially compressed against the conduit outer surface. This colleting function provides conduit support, isolation or reduction of the conduit vibration and flexure, and reduces or limits additional indentation of the balls 274 into the conduit C.

Figure 11A:
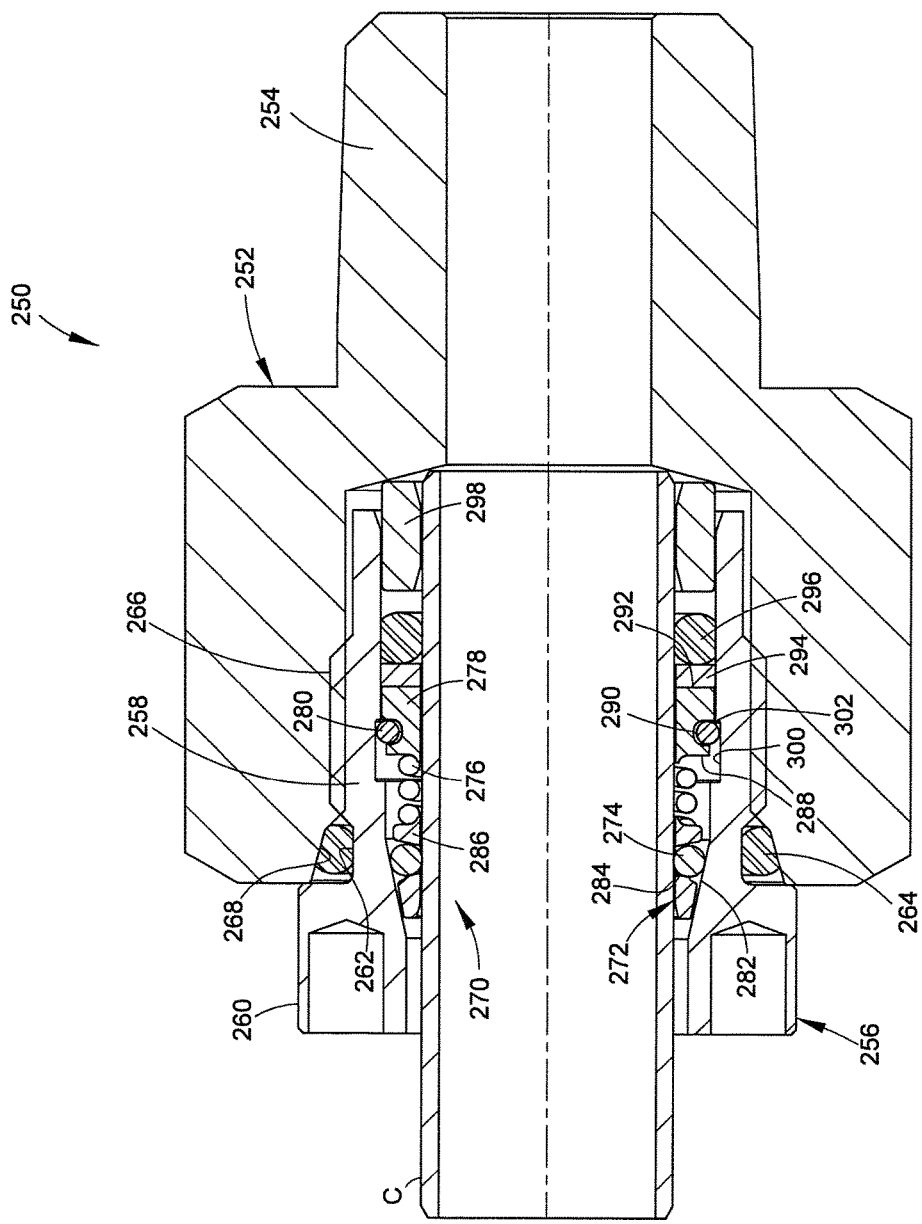
Figure 11D:
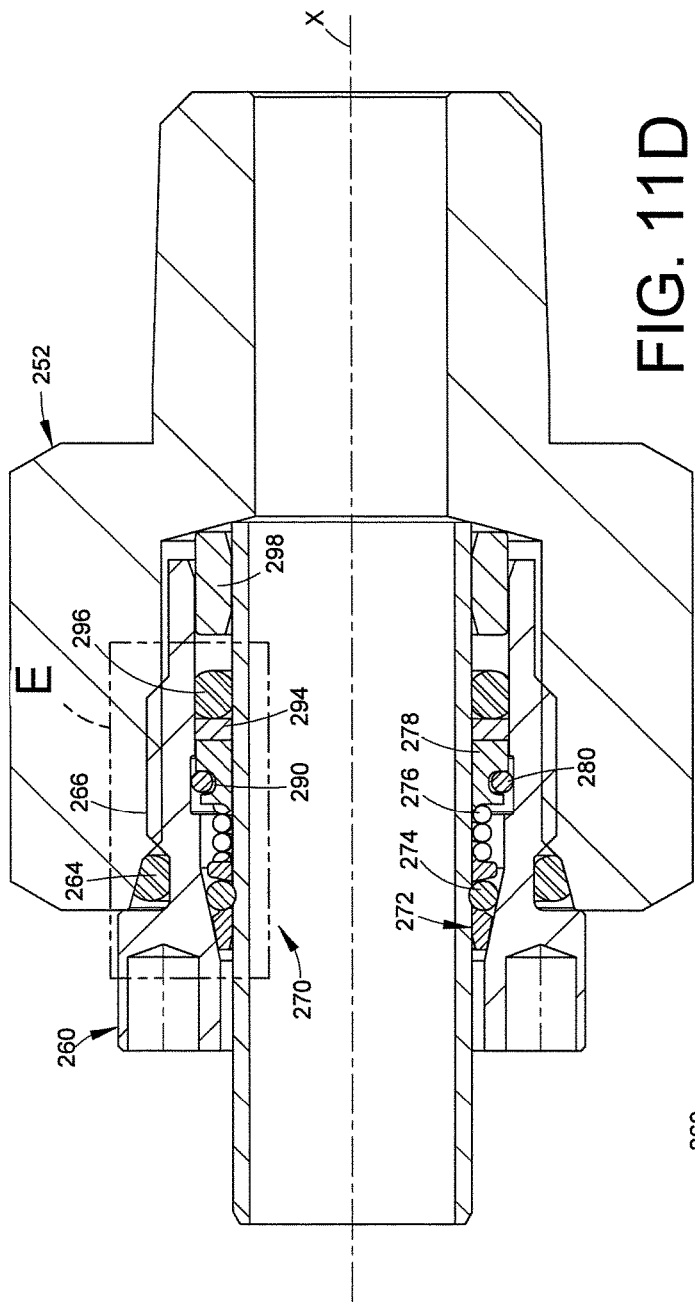
Figure 11E:
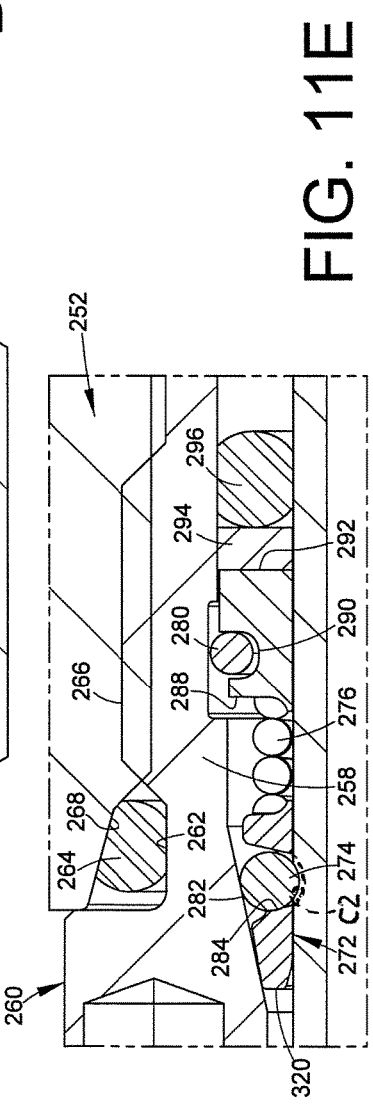

In comparing FIG. 11A with FIGS. 11D-11E, FIG. 11A shows the fitting assembly 250 without pressure and FIGS. 11D and 11E show the fitting assembly 250 under pressure. When under pressure, the inner seal 296 applies an axial load against the gland 278 which places an axial load on the ball carrier 272. In the unpressurized condition, there may be a small radial gap between the tab lands 311 and the tapered surface 282, and/or a small radial gap between the tab colleting surfaces 312 and the conduit C. Under pressure, the balls 274 indent into the conduit surface allows the retainer 270 to shift axially slightly so that the tabs 310 contact the tapered surface 282 and begin to collet against the conduit outer surface. The colleting action restrains further axial movement of the ball carrier 272, supports the conduit, adds rigidity to the fitting assembly 250 and isolates or reduces the effects of vibration and flexure of the conduit on the stress regions of the balls 274 against the conduit C.

Figure 11F:
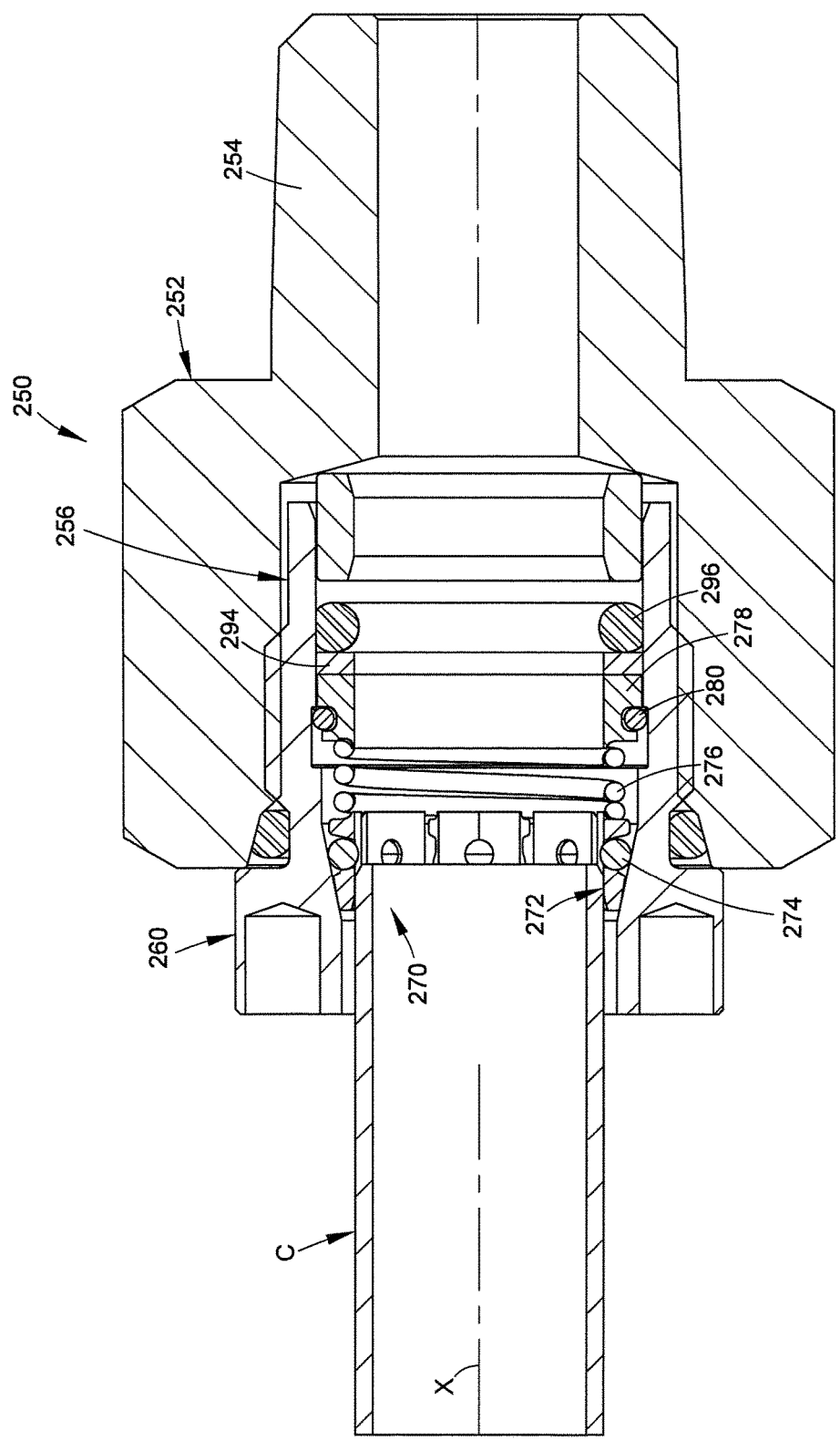

FIG. 11F illustrates position of the fitting assembly members as the conduit is being inserted. As in the prior embodiments, as the conduit is inserted, the balls 274 can radially expand to allow the conduit to pass through. As soon as the conduit passes axially past the balls 274, the conduit is trapped against being axially withdrawn.

Figure 11G:
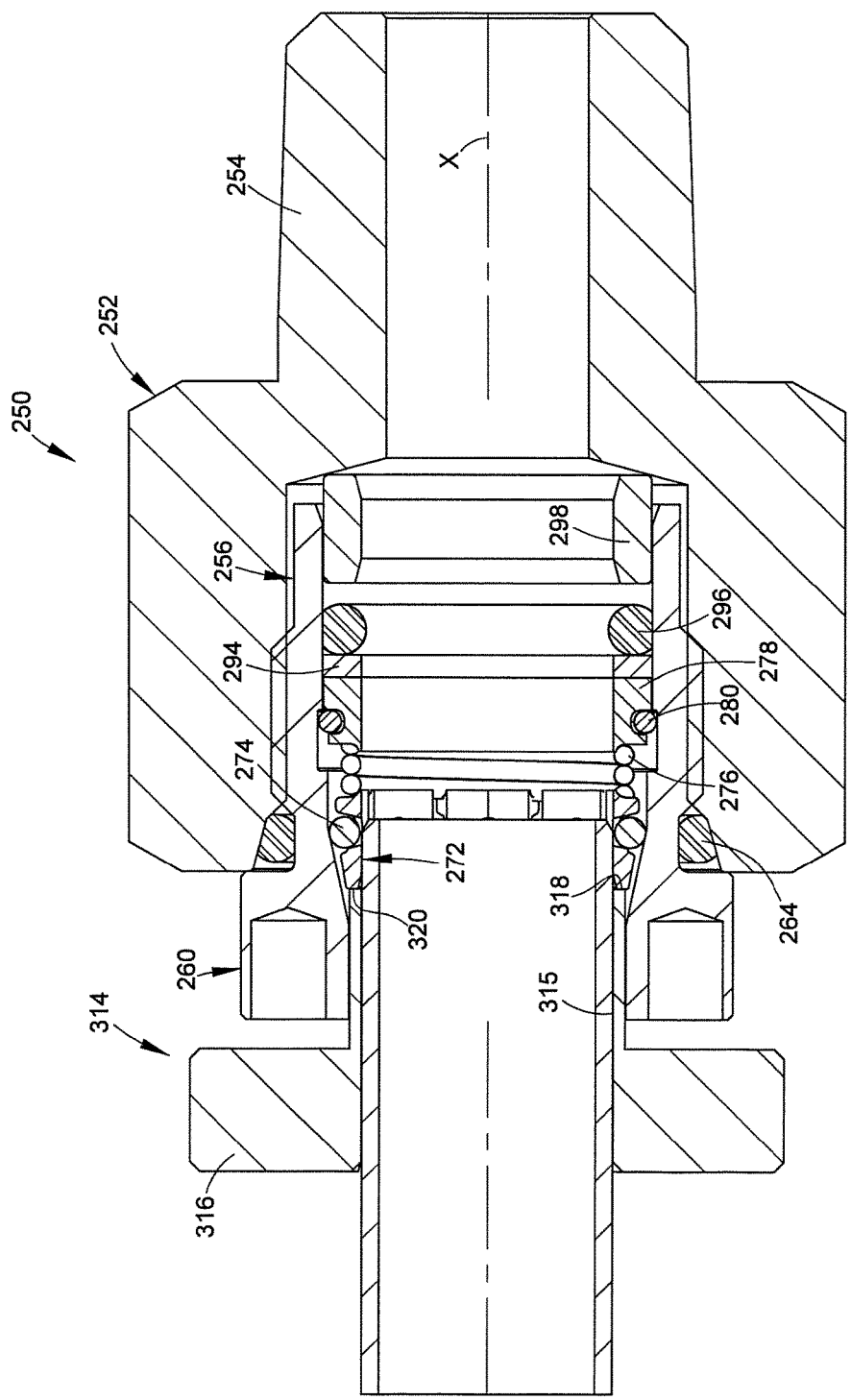

FIG. 11G illustrates an embodiment of a conduit removal tool 314 with the fitting assembly 250. The tool 314 may include an enlarged flange 316 that can be manually grasped or otherwise axially moved. The tool 314 further includes a thin tubular extension 315 of sufficient length that the distal end 318 of the tool may be axially pushed against the outboard end 320 of the ball carrier body 304. In this manner, the ball carrier body 304 may be axially pushed inward against the force of the biasing member 276, which allows the balls 274 to expand radially outward to permit the conduit C to be withdrawn from the fitting assembly 250.

Figure 11H:
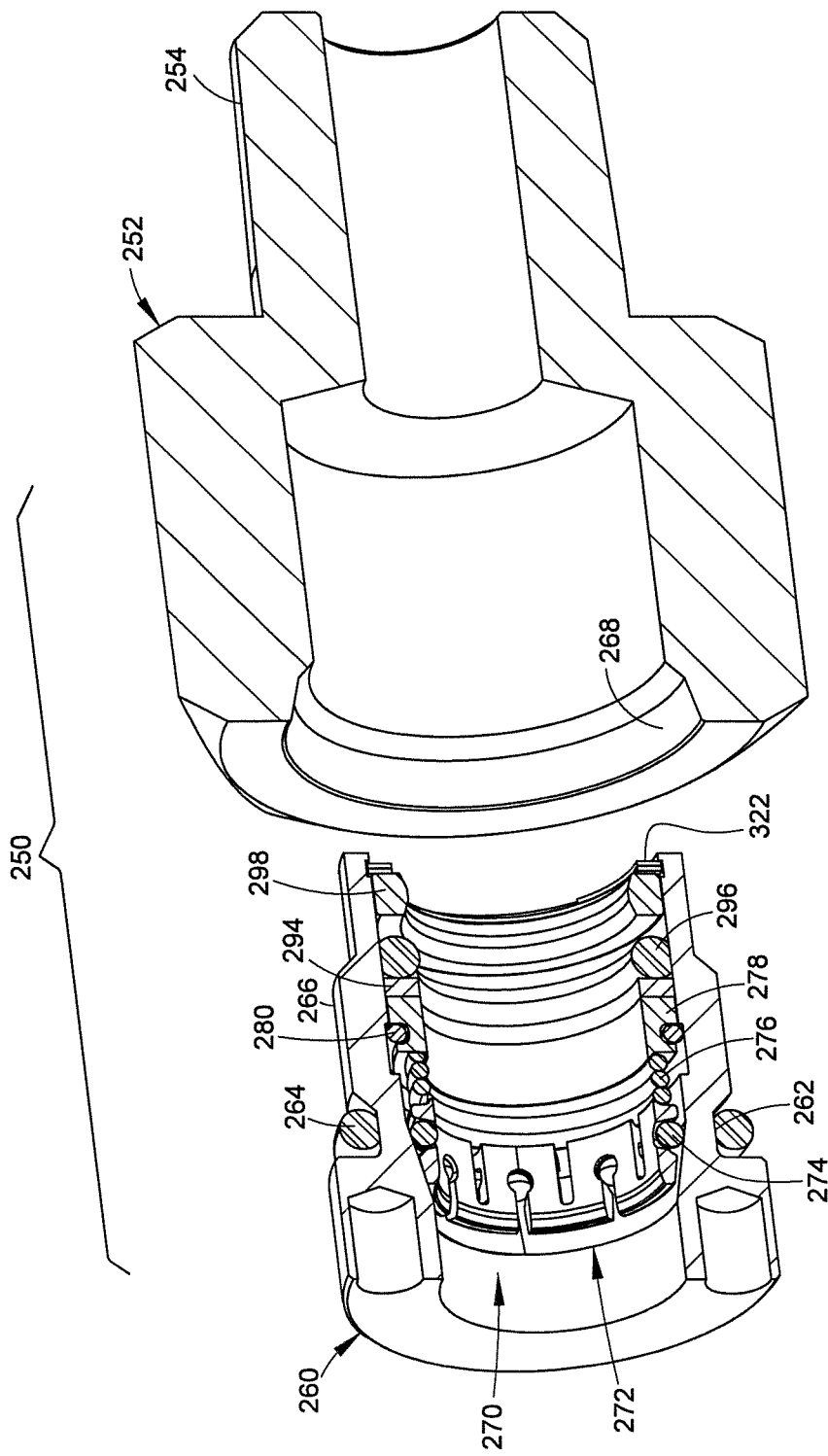

FIG. 11H illustrates an alternative embodiment in which a retaining ring 322 may be used to retain the seal backing ring 294, inner seal 296, and second gland 298 with the male threaded nut 258. In this manner, the second fitting component 256 may be realized as a self-contained cartridge or subassembly that can be mated up with many different female ports 252.

FIG. 11I is an exploded perspective illustration of the fitting assembly 250 including the retaining ring 322 embodiment.

Figure 12A:
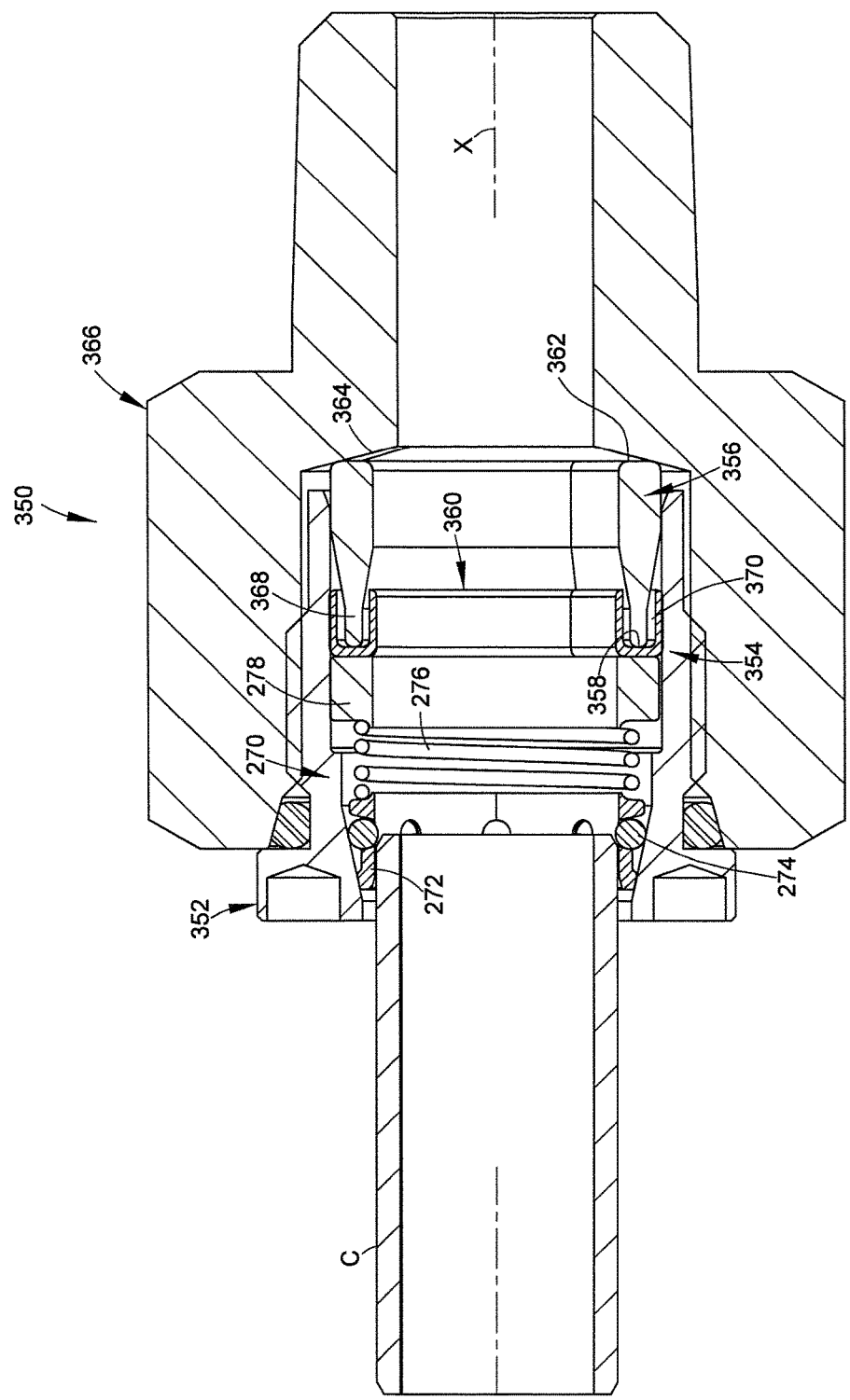
FIG. 12A-12B illustrate another exemplary embodiment of a single action push to connect fitting assembly including a colleting feature and an all metal configuration.
Figure 12B:
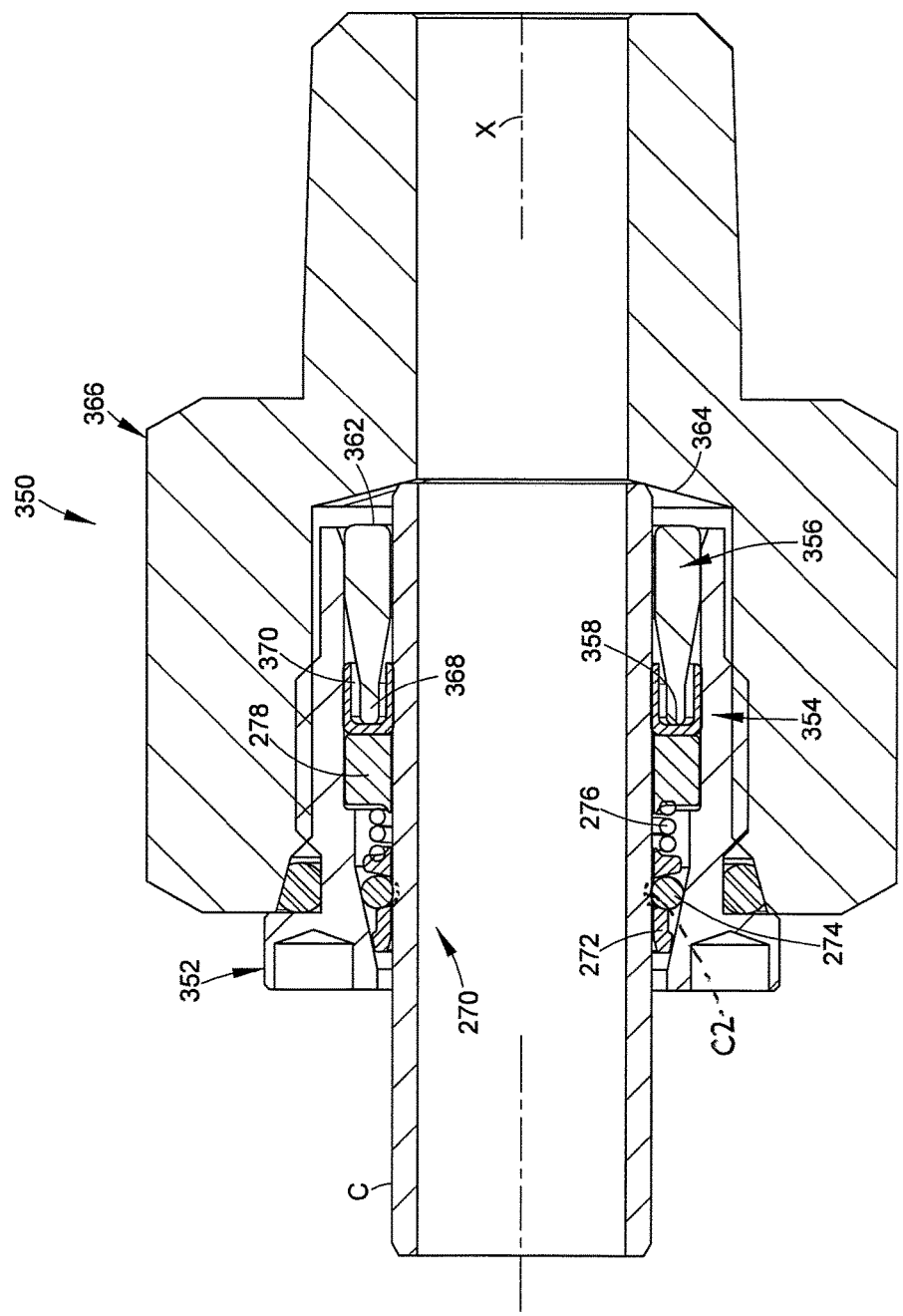

With reference next to FIGS. 12A and 12B, we provide another embodiment of a single action push to connect fitting assembly 350 that includes a colleting feature. In addition, the fitting assembly 350 comprises all parts that are non-polymeric. For example, all the parts may be metal, such as for example 316 stainless steel, or may include non-polymeric composite materials such as ceramics and so on. By eliminating polymer based sealing components, the fitting assembly 350 may be used in applications having operating temperatures higher or lower than temperatures that can be accommodated with polymeric components such as the seals.

In an embodiment, the fitting assembly 350 may be but need not be similar or the same as the embodiment of FIGS. 11A-11I above. In the illustrated embodiment of FIGS. 12A and 12B, however, we omit the retaining member 280. The fitting assembly may include the retainer 270 having the ball carrier 272, the conduit gripping devices or balls 274, the biasing member 276 and the gland 278. Since we do not use the retaining member 280 in this embodiment, the gland 278 does not need to have the outer groove 290. Therefore, the retainer 270 is not held together as a subassembly with the second fitting component 352, which may be a male threaded nut.

In place of the inner seal 296, the seal backing ring 294 and the second gland 298, we use a non-polymeric sealing member 354 and a seal supporting gland 356, such that the seal device forms a non-polymeric seal between the conduit and the second fitting component or nut. In other embodiments (not shown), a non-polymeric sealing member may be provided to form a non-polymeric seal between the conduit and the first fitting component or body.

The non-polymeric seal 354 may be realized in many different forms, including but not limited to a commercially available all-metal lip seal. The lip seal 354 is commonly available in a C-shaped cross-section having a distal end that forms a facing wall 358. Lip seals typically are used in an orientation in which the open side or end 360 faces the high pressure side of the fitting assembly 350 as illustrated in FIG. 12B. Alternatively, other non-polymeric seals may be used, for example, an all metal C-seal well known to those skilled in the art and which is a traditional radially loaded seal to seal shafts. Lip seals and C-seals and axial seals are commercially available from a number of sources, including JetSeal Inc. of Spokane, Wash., or Nicholson Sealing Technologies, Ltd., of Stanley, UK.

Preferably, the supporting gland 356 has an extended axial length so that when the fitting assembly 350 is fully assembled, the back end 362 of the supporting gland 356 contacts a surface 364 of the first fitting component 366, which may be a female threaded body or port. The supporting gland 356 extends axially towards the retainer 270, and may include a reduced diameter neck portion 368 so that the neck portion 368 may be received in the open interior portion 370 of the lip seal 354. The axial length of the supporting gland 356 is preferably selected so that when the fitting assembly 350 is fully assembled, an inboard end of the neck portion 368 contacts and supports the facing wall 358 under axial load of the biasing member 276 so that the radial seal load on the lip seal 354 is maintained. Insertion of the conduit C into the fitting assembly 350, as well as retention and release of the conduit C with respect to the fitting assembly 350, may be similar to the embodiment of FIGS. 11A-11I above.

Figure 13A:
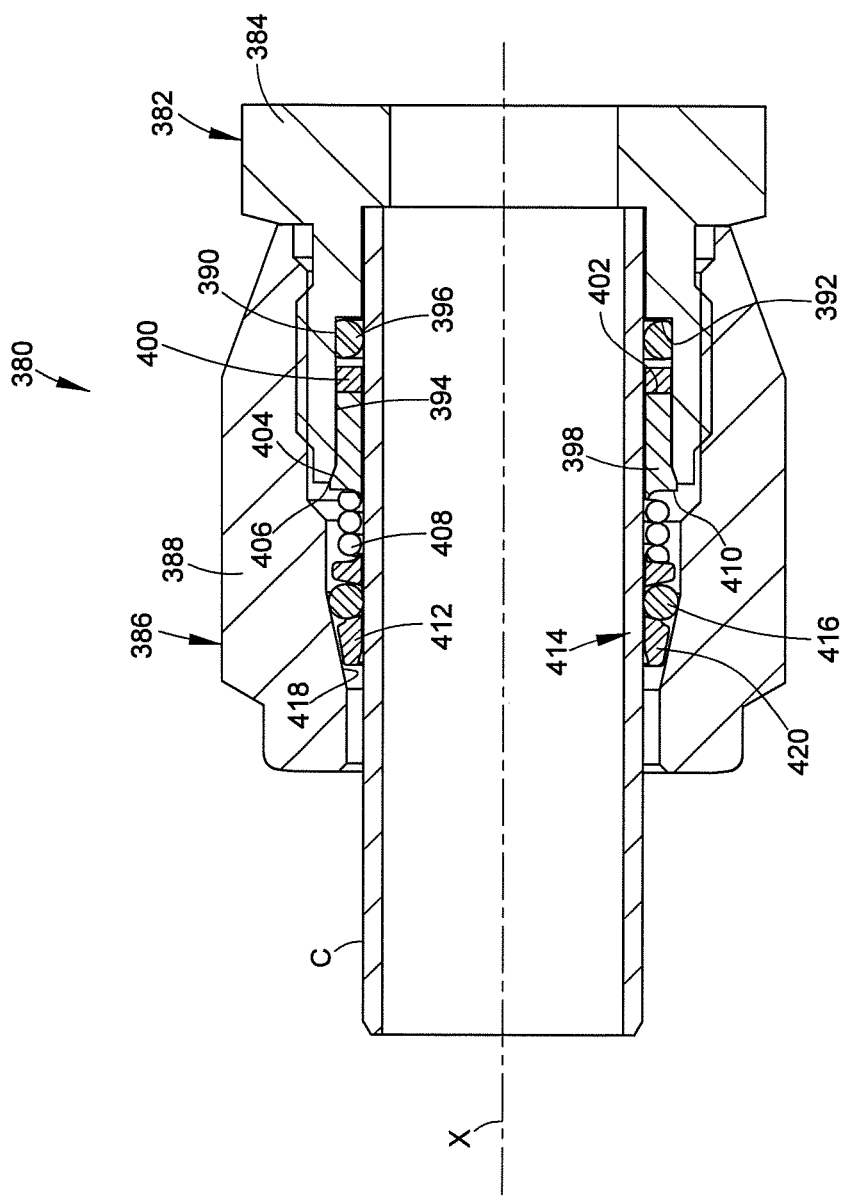
FIGS. 13A-13C illustrate another exemplary embodiment of a single action push to connect fitting assembly including a colleting feature, with the fitting assembly having a male configuration.
Figure 13B:
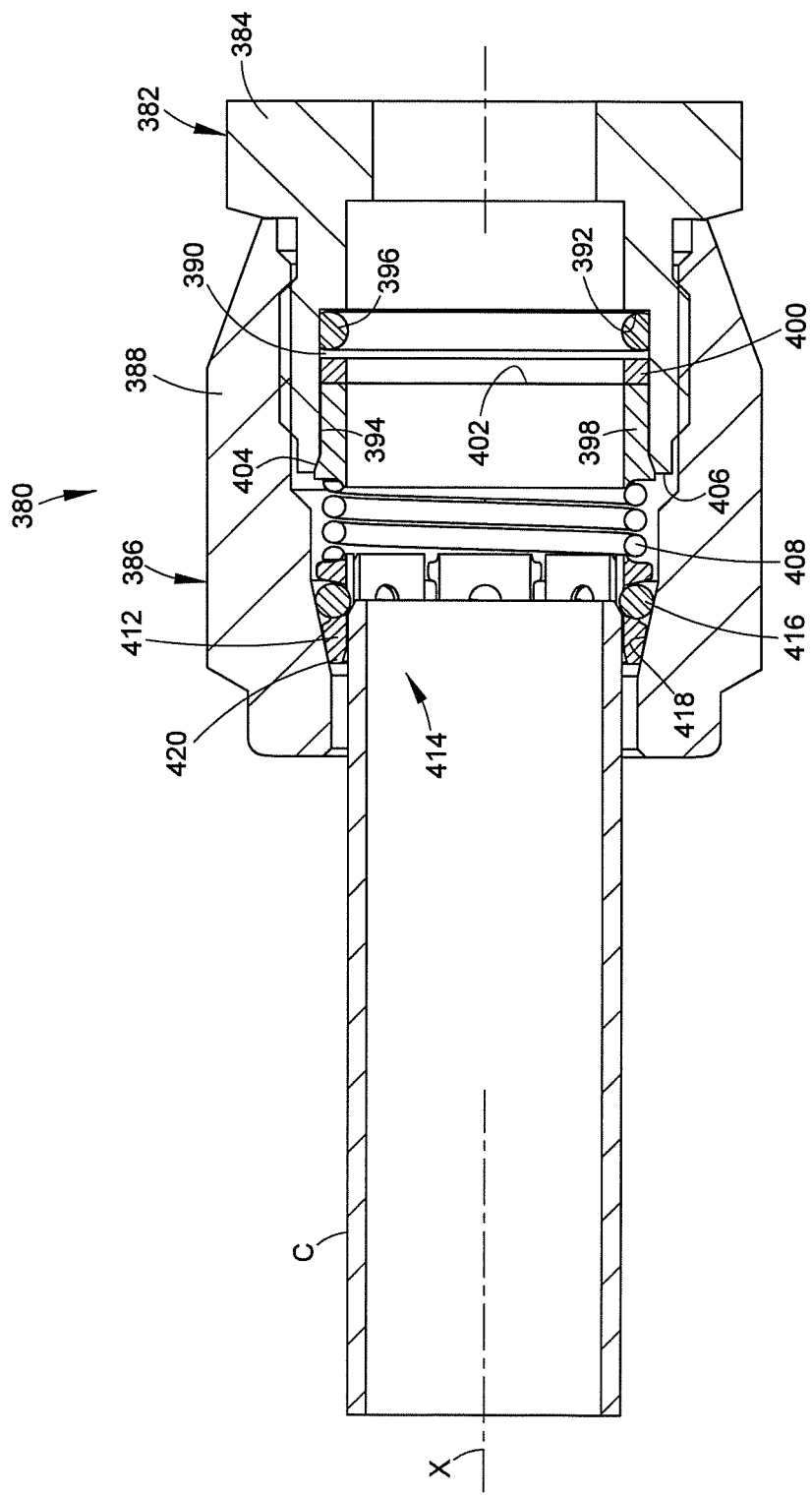
Figure 13C:
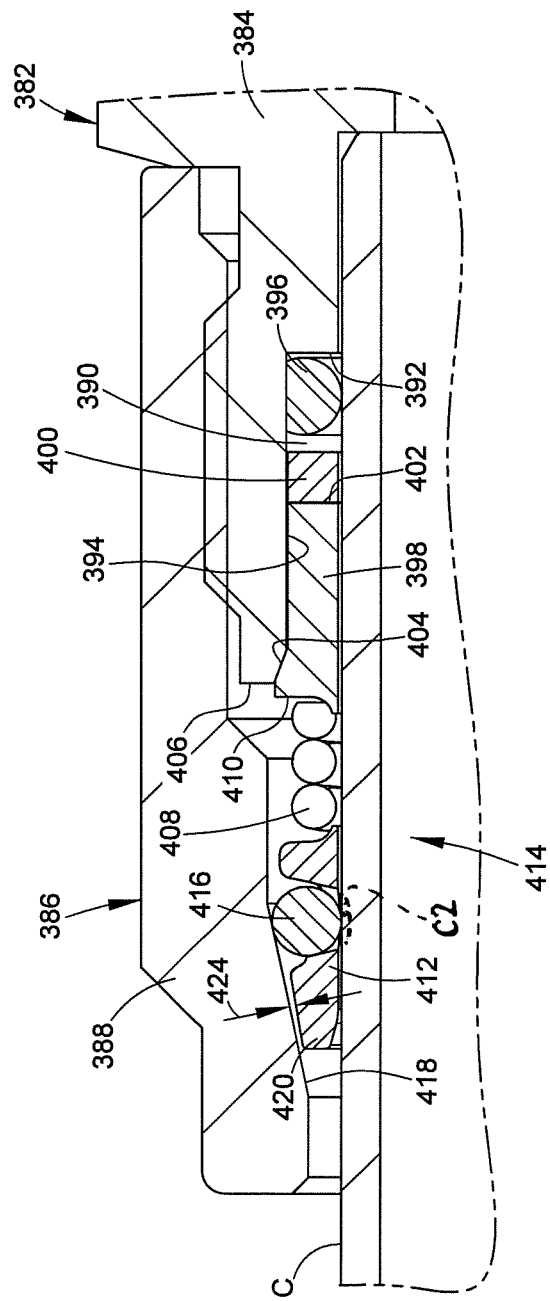

With reference to FIGS. 13A-13C, we illustrate another embodiment of a single action push to connect fitting assembly 380 that provides a colleting feature. Note that FIG. 13C is an enlarged illustration of the fitting assembly in half cross-section. The fitting assembly 380 shares many common elements as the embodiments of FIGS. 10A through 12A, but in a male configuration. By male configuration is meant that the fitting component that receives the conduit is a male threaded body and the mating fitting component is a female threaded nut. This is in comparison to the earlier embodiments which are a female configuration, for example, the female threaded ports, wherein the conduit receiving fitting component is a female threaded body and the mating component is a male threaded nut.

The fitting assembly 380 may include a first fitting component 382 in the form of a male threaded body 384 and a mating second fitting component 386 in the form of a female threaded nut 388. Although in all the exemplary embodiments herein we show threaded mechanical connections between the first fitting component and the second fitting component, non-threaded connections may alternatively be used, for example, crimped connections.

The male threaded body 384 includes a conduit end socket 390 and may optionally present a counterbore shoulder 392 against which the conduit is bottomed in the final assembled condition. The male threaded body 384 further includes a through bore 394 in which is disposed an inner seal member 396 that provides a fluid tight seal against the conduit C when the fitting connection is complete, as shown in FIG. 13A. A gland 398 is also received in the male threaded body 384 with a backing ring 400 disposed between the outboard end 402 of the gland and the inner seal member 396. Preferably, the gland 398 includes an optional outwardly flared end 404 that contacts an end portion 406 of the male threaded body 384 so that the axial movement of the gland 398 towards the inner seal member 396 is limited. This not only prevents the gland 398 from axially compressing the inner seal member 396, but also provides a stop position so that a biasing member 408 is compressed between an inboard end 410 of the gland 398 and a ball carrier 412.

A retainer 414 is provided that may be but need not be the same as the retainer 270 of the embodiment of FIGS. 11A-11I. The retainer 414 may include the ball carrier 412, one or more conduit gripping members 416, for example, in the form of spherical balls 416, the biasing member 408 and the gland 398. The ball carrier 412 may be the same as the ball carrier 272 so that description is not repeated. The ball carrier 412, under the axial force provided by the biasing member 408, engages with a tapered surface 418 presented in the female threaded nut 388. The ball carrier 412 axially aligns and positions the balls 416 relative to the tapered surface 418 so that after the conduit is inserted past the balls 416, the balls 416 are trapped between the tapered surface 418 and the outer surface of the conduit C, as depicted in FIG. 13A. Therefore, the conduit C cannot be withdrawn from the fitting assembly 380. As in the previous embodiments described above, the ball carrier 412 includes a plurality of flexible members having tabs 420 that function to collet the conduit when the fitting is pressurized. When pressurized, the fluid pressure applies an axial force on the inner seal member 396 which transmits the axial force through the gland 398 and the biasing member 408 to the ball carrier 412. The balls 416 indent into the outer surface of the conduit C which allows the tabs 420 to be compressed between the tapered surface 418 and the conduit, thereby colleting the conduit. Note from FIG. 13C which shows the fitting assembly 380 in an unpressurized condition, that there preferably is a radial gap 424 between the tabs 420 and the tapered surface 418. This gap is also present in other of the embodiments herein in the unpressurized state as described hereinabove.

It should be noted that a lip seal, C-seal or other non-polymeric seal may be used in place of the inner seal member 396 and the backing ring 400 in manner that may be similar to the embodiment of FIGS. 12A and 12B. Also, as in the embodiment of FIG. 11G, a tool 314 may be used to release the conduit C from the assembled fitting assembly 380. Note that the tool 314 may be used with various of the disclosed embodiments herein.

Also, it should be noted that although the exemplary embodiments herein preferably use conduit that has a smooth hollow cylindrical geometry, the conduit may alternatively have a groove or recess formed in the outer surface of the conduit wall at an axial position that aligns with the conduit gripping members such as the spherical balls. The groove or recess can in some applications enhance the conduit grip by the conduit gripping members because the balls will not have to be forced to indent into the conduit surface. Engagement of the conduit gripping members with the conduit groove may also provide a detectable positive indication of full insertion or installation of the conduit in the fitting assembly. The colleting action of the colleting portion against the outer surface of the conduit, outboard of the groove, reduces stress concentrations at the conduit groove, which may otherwise result from vibration or flexure of the conduit outboard of the groove. Exemplary conduit grooves C2 are illustrated in phantom in FIGS. 10C, 11E, 12B, and 13C.

FIG. 14 illustrates another embodiment of a ball carrier 430. Rather than manufacturing a single piece component for the ball carrier 430, the ball carrier 430 may be made using a plurality of interconnected arcuate sections or segments 432. Each section 432 includes a male pin 434 and a female slot 436 that can be connected so that adjacent sections 432 are securely held together. Each section 432 may include flexible members 438 with tabs 440 at the distal end portions. Note that each section 432 preferably has a curvature that is compliant with the size of the conduit and the fitting assembly. Each section 432 may also include a ball cavity 442 that receives a conduit gripping member such as a spherical ball 444.

The inventive aspects and concepts have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A push to connect fitting assembly for a conduit having a longitudinal axis, the fitting assembly comprising:
   a first fitting component having an outboard end that is adapted to receive a conduit end;
   a second fitting component joined to the first fitting component to define an interior cavity;
   a seal device disposed in the interior cavity, wherein the seal device forms a non-polymeric seal between one of the first and second fitting components and an outer surface of a conduit end when the conduit end is inserted into the outboard end of the first fitting component;
   a retainer assembled with at least one of the first and second fitting components, the retainer including a gripping portion that grips the inserted conduit end; and
   a biasing member axially disposed between the retainer and the seal device, the biasing member applying a first axial load to the retainer to produce a gripping force between the gripping portion and the inserted conduit end.

2. The fitting assembly of claim 1, wherein the seal device forms an all metal seal between the one of the first and second fitting components and the outer surface of the inserted conduit end.

3. The fitting assembly of claim 1, wherein the seal device includes an annular lip seal having an inboard facing C-shaped cross section.

4. The fitting assembly of claim 3, wherein the seal device further includes a supporting gland having a first end adjacent an inner shoulder portion of the first fitting component, and a second end received in the C-shaped cross-section of the annular lip seal.

5. The fitting assembly of claim 1, wherein the retainer further comprises an annular retainer body and a colleting portion outboard of the gripping portion, wherein the gripping portion engages the inserted conduit end over a first surface contact area to grip the conduit end, and the colleting portion engages the inserted conduit end over a second surface contact area greater than the first surface contact area to collet the inserted conduit end.

6. The fitting assembly of claim 5, wherein at least one of the gripping portion and the colleting portion comprises at least one bearing member captured between the retainer body and the second fitting component.

7. The fitting assembly of claim 5, wherein at least one of the gripping portion and the colleting portion comprises at least one axially extending, radially flexible member.

8. The fitting assembly of claim 7, wherein the at least one flexible member is integral with the retainer body.

9. The fitting assembly of claim 5, wherein the gripping portion comprises a plurality of bearing members captured between the retainer body and a tapered surface of the fitting assembly, and the colleting portion comprises a plurality of axially extending, radially flexible members integral with the retainer body.

10. The fitting assembly of claim 5, wherein the retainer body comprises a plurality of arcuate segments assembled to form an annular cross-section.

11. The fitting assembly of claim 10, wherein the gripping portion comprises a plurality of bearing members and the colleting portion comprises a plurality of axially extending, radially flexible members, wherein each of the plurality of arcuate segments defines at least one cavity receiving one of the plurality of bearing members, and each of the plurality of arcuate segments forms at least one of the plurality of flexible members.

12. The fitting assembly of claim 5, wherein the gripping portion comprises a plurality of bearing members retained in a corresponding plurality of cavities in the retainer body.

13. The fitting assembly of claim 5, wherein the retainer further includes a second colleting portion inboard of the gripping portion.

14. The fitting assembly of claim 5, wherein the second fitting component comprises a tapered interior surface that engages at least one of the gripping portion and the colleting portion to move the at least one of the gripping portion and the colleting portion radially inward toward engagement with the outer surface of the inserted conduit end.

15. The fitting assembly of claim 5, wherein the colleting portion defines a curved inner surface conforming to a cylindrical outer surface of the inserted conduit end.

16. The fitting assembly of claim 5, wherein the colleting portion is separated from the outer surface of the inserted conduit end by a radial gap when no external outward axial load is applied to the inserted conduit end.

17. The fitting assembly of claim 5, wherein the gripping portion is biased against a first portion of a tapered interior surface of the fitting assembly to grip the inserted conduit end, and the colleting portion is biased against a second portion of the tapered interior surface of the fitting assembly to collet the inserted conduit end.

18. The fitting assembly of claim 1, wherein the first fitting component comprises a female threaded body and the second fitting component comprises a male threaded nut.

19. The fitting assembly of claim 1, wherein the gripping portion grips the inserted conduit end upon insertion of the conduit end into the outboard end of the first fitting component.

20. The fitting assembly of claim 1, wherein the biasing member applies a second axial load to the seal device to produce a radial seal load between the seal device and the one of the first and second fitting components and the inserted conduit end.

\* \* \* \* \*

UNITED STATES PATENT AND TRADEMARK OFFICE
CERTIFICATE OF CORRECTION

PATENT NO. : 10,458,582 B2
APPLICATION NO. : 15/135645
DATED : October 29, 2019
INVENTOR(S) : Peter C. Williams et al.

Page 1 of 1

It is certified that error appears in the above-identified patent and that said Letters Patent is hereby corrected as shown below:

In the Specification

Column 1, Lines 2-3, after Ser. No. should read ---62/151,465, filed on April 23, 2015---

Signed and Sealed this
Second Day of June, 2020

Andrei Iancu
*Director of the United States Patent and Trademark Office*